(12) United States Patent
Cheng et al.

(10) Patent No.: US 8,539,408 B1
(45) Date of Patent: Sep. 17, 2013

(54) METHOD FOR THERMAL SIMULATION

(75) Inventors: Ming-Cheng Cheng, Potsdam, NY (US); Brian T. Helenbrook, Potsdam, NY (US)

(73) Assignee: Clarkson University, Potsdam, NY (US)

( * ) Notice: Subject to any disclaimer, the term of this patent is extended or adjusted under 35 U.S.C. 154(b) by 471 days.

(21) Appl. No.: 12/462,078

(22) Filed: Jul. 29, 2009

Related U.S. Application Data

(60) Provisional application No. 61/129,910, filed on Jul. 29, 2008, provisional application No. 61/199,233, filed on Nov. 14, 2008.

(51) Int. Cl.
G06F 17/50 (2006.01)

(52) U.S. Cl.
USPC ............................ 716/110; 716/111; 716/115

(58) Field of Classification Search
USPC ........................................................ 716/110
See application file for complete search history.

(56) References Cited

U.S. PATENT DOCUMENTS

| | | | |
|---|---|---|---|
| 6,538,191 B1 | 3/2003 | MacDonald | |
| 6,931,369 B1 | 8/2005 | Perry et al. | |
| 7,039,888 B2 | 5/2006 | Steinmann et al. | |
| 7,194,711 B2 | 3/2007 | Chandra | |
| 7,291,036 B1 | 11/2007 | Daily et al. | |
| 7,321,220 B2 | 1/2008 | Plett | |
| 7,332,820 B2 | 2/2008 | Tan et al. | |
| 7,335,975 B2 | 2/2008 | Cady et al. | |
| 7,344,969 B2 | 3/2008 | Tan et al. | |
| 7,401,304 B2 | 7/2008 | Li et al. | |
| 2008/0083450 A1 | 4/2008 | Benoit et al. | |
| 2008/0311468 A1 | 12/2008 | Hermann et al. | |
| 2009/0004556 A1 | 1/2009 | Al-Hallaj et al. | |
| 2009/0023056 A1 | 1/2009 | Adams et al. | |
| 2009/0024347 A1* | 1/2009 | Chandra et al. | 702/130 |
| 2009/0044156 A1 | 2/2009 | Chandra et al. | |
| 2009/0071178 A1 | 3/2009 | Major et al. | |
| 2009/0104523 A1 | 4/2009 | Mullin et al. | |
| 2009/0319964 A1* | 12/2009 | Kariat et al. | 716/4 |
| 2010/0023903 A1* | 1/2010 | Pramono et al. | 716/5 |

OTHER PUBLICATIONS

Pesaran, Ahmad, "Improving Battery Design with Electro-Thermal Modeling," Aug. 2005, National Renewable Energy Laboratory.*

(Continued)

Primary Examiner — Vuthe Siek
Assistant Examiner — Eric Lee
(74) Attorney, Agent, or Firm — Gerow D. Brill

(57) ABSTRACT

The invention of novel methods is described for efficient and accurate thermal simulation of a structure that can be primarily constructed using building blocks. These structures may include, but not limited to, semiconductor chips, photovoltaic/solar panels, battery packs, etc. The methods are formulated in hierarchical function spaces, rather than the physical space and provide three-dimensional (3D) steady-state and transient temperature profiles of the structure, which are as detailed as full-scale numerical simulation, using substantially less computational degrees-of-freedom (DOF). The number of DOF required is comparable to that of lumped thermal models, yet no ad-hoc modeling assumptions related to geometry, dimensions, temperature profiles, or heat flow paths are required. The methods can be applied to evaluate temperature profiles at different levels of granularity. The methods can also be implemented in various computer-aided-design (CAD) or electronic-design-automation (EDA) tools for different technologies to perform electro-thermal simulations.

31 Claims, 12 Drawing Sheets

(56) References Cited

OTHER PUBLICATIONS

Zauscher, Melanie, "Solar Photovoltaic Panels From a Heat Transfer Perspective," Dec. 7, 2006, University of California, San Diego.*
M. Pedram, S. Nazarian, "Thermal Modeling, Analysis, and Management in VLSI Circuits; Principles and Methods," Proceedings of the IEEE, vol. 94, pp. 1487-1501, 2006.
C. Basaran, Y. Wen, "Analysis of Multilayered Microelectronic Packaging Under Thermal Gradient Loading," IEEE Trans. Comp. Packag. Technol., vol. 29, p. 850, 2006.
K. Squadron, M. R. Stan, Huang, S. Velusamy, K. Sankaranarayanan, and D. Tarjan, "Temperature-aware microarchitecture," Proc. ISCA, pp. 2-13, 2003.
S. Im and K. Banerjee, "Full chip Thermal analysis of planar (2-D) and vertically stacked integrated (3-D) high performance ICs," IEDM Tech. Dig., pp. 727-730, 2000.
Akin Akturk, Neil Goldman, George Metze, "Self-Consistent Modeling of Heating and MOSFET Performance in 3-D Integrated Circuits," IEEE Trans. Electron Dev. vol. 52, pp. 2395-2403, 2005.
J. A. Davis, R. Venkatesan, A. Kaloyeros, M. Beylansky, S. J. Souri, K. Banerjee, K.C. Saraswat, A. Rahman, R. Reif, and J.D. Meindl, "Interconnect limits on gigascale integration (GSI) in the 21st century," Proc. of the IEEE, vol. 9, pp. 305-324, 2001.
K.W. Guarini, et al., "Electrical integrity of state-of-the-art 0.13 µm SOI CMOS devices and circuits transferred for three-dimensional (3D) integrated circuit (IC) fabrication," IEDM'02, Dig., pp. 943-945, 2002.
T.Y. Wang, C.C.P. Chen, "3-D-thermal ADI: A linera-time chip level transient thermal simulator," IEEE Trans. Comput.-Aided Des. Integr. Circuits Syst., vol. 21, pp. 1434-1445, 2002.
K. Puttaswamy, G.H. Loh, "Thermal Analysis of a 3D DieStacked HighPerformance Microprocessor," Proc. GLSVLSI 2006, pp. 19-24, 2006.
G.H. Loh, Y. Xie, B. Black, "Processor Design in 3d Die-Stacking Technologies," IEEE Micro, pp. 31-48, May-Jun. 2007.
A. K. Noor, "Reduced basis Technique for nonlinear analysis of structures," AIAA J., vol. 18, pp. 455-462, 1980.
J. L. Lumley, "Atmospheric turbulence and radio wave propagation," Journal of computational chemistry, vol. 23, pp. 1236-1243, 1967.
N. Aubry, P. Holmes, J.L. Lumley, E. Stone, "The dynamics of coherent structures in the wall region of a turbulent boundary layer," J. Fluid Mech., vol. 192, pp. 115-173, 1988.
B. J. O'Donnell and B. T. Helenbrook, "Proper orthogonal decomposition and incompressible flow: An application to particle modeling," Comput. & Fluids, vol. 36, pp. 1174-1186, 2007.
D. N. Arnold, F. Brezzi, B. Cockburn, and L. D. Marini, "Unified analysis of discontinuous Galerkin methods for elliptic problems," SIAM J. Numer. Anal., 39(5):1749-1779, 2002.
http://www-device.eecs.berkeley.edu/~bsimsoi/.
M.C. Cheng, K. Zhang, "Non-isothermal Circuit for SOI MOSFETs for Electrothermal Simulation of SOI Integrated Circuits," Int. Semicond. Dev. Res. Symp., College Park, MD, Wp9-06-05, 2007.
F. Yu, M.C. Cheng, P. Habitz, G. Ahmadi, "Modeling of Thermal behavior in SOI structures," IEEE Trans. Electron Devices, vol. 51, 83, 2004.
F. Yu, M.C. Cheng, "Electrothermal Simulation of SOI CMOS Analog Intregrated Circuits," Solid-State Electronics, vol. 51, pp. 691-702, 2007.
P. Liu, H. Li, L. Jin, W. Wu, Sheldon X.D. Tan, J. Yang, "Fast Thermal Simulation for Runtime Temperature Tracking and Management," IEEE Trans. Comput.-Aided Des. Integr. Circuits Syst., vol. 25, pp. 288-2893, 2006.

Z. Wangl, B.D. Jensen, L.L.W. Chow, J.L. Volakis, K. Saitou, K. Kurabayashi, "Full-wave electromagnetic and thermal modeling for the prediction of heat-dissipation-induced RF-MEMS switch failure," J. Micromech. Microeng. vol. 16, pp. 157-164, 2006.
D.R. Decker, "MMIC Packaging Design and Research," IEEE Princeton Section Sarnoff Symposium, pp. 0_112-0_117, Mar. 1993.
J. Shi, W.Y. Yin, K. Kang, J.F. Mao, L.W. Li, "Frequency-Thermal Characterization of On-Chip Transformers With Patterned Ground Shields," IEEE Trans. Microwave Theory Techniques, vol. 55, pp. 1-12, 2007.
W.Y. Yin, K. Kang, J.F. Mao, "Electromagnetic-Thermal Characterization of on On-Chip Coupled (A)Symmetrical Interconnects," IEEE Trans. Advanced Packaging, vol. 30, pp. 851-863, 2007.
J.R. Brauer, P. Wallen, "Coupled 3D electromagnetic, structural, and thermal finite elementanalysis as integral components of electronic product design," WESCON, pp. 358-364, 1996.
M. Loeser, B. Witzigmann, "Multidimensional Electro-Opto-Thermal Modeling of Broad-Band Optical Devices," IEEE J. Quantum Electronics, vol. 44, pp. 505-514, 2008.
P.V. Mena, J. J. Morikuni, , S.M. Kang, A. V. Harton, K.W. Wyatt, A Comprehensive Circuit Level Model of Vertical-Cavity Surface-Emitting Lasers, J. Lightwave Technology, vol. 17, pp. 2612-2632, 1999.
G. Hatakoshi, M. Ishikawa, "Analysis of thermal response characteristics of semiconductor by self-consistent electro-opto thermal simulation," Proc. IEEE/LEOS 3rd Int. Conf. on Numerical Simulation of Semiconductor Optoelectronic Devices, pp. 27-28, Oct. 2003.
M. Thele, E. Karden, E. Surewaard, D.U. Sauer, "Impedance-based overcharging and gassing model for VRLA/AGM batteries," J. of Power Sources, vol. 158, pp. 953-963 (2006).
K. Onda, H. Kameyama, T. Hanamoto, K. Ito, "Experimental Study on Heat Generation Behavior of Small Lithium-Ion Secondary Batteries," J of Electrochemical Soc., vol. 150. pp. A285-A291 (2003).
S. A. Hallaj, H. Maleki, J.S. Hong, J.R. Selman, "Thermal modeling and design considerations of lithium-ion batteries," J. of Power Sources, vol. 83, pp. 1-8 (1999).
M.W. Verbrugge, R.S. Conell, "Electrochemical and Thermal Characterization of Battery Modules Commensurate with Electric Vehicle Integration," J. of The Electrochemical Society, vol. 149, pp. A45-A53 (2002).
M. Ducusin, S. Gargies, C. Mi, "Modeling of a Series Hybrid Electric High-Mobility Multipurpose Wheeled Vehicle," IEEE Trans. Vehicular Tech., vol. 56, pp. 557-565 (2007).
F. V. Gasparyan, "Influence of Thermal Effect on the Efficiency of a Solar Cell," J. of Contemporary Physics vol. 42, No. 3, pp. 112-115, 2007.
M. A. Grepl, Y. Maday, N. C. Nguyen, A. T. Patera, "E?cient reduced-basis treatment of nona?ne and nonlinear partial di?erential equations," Mathematical Modelling and Numerical Analysis, vol. 41, No. 3, pp. 575-605, 2007.
A. E. Lovgren, Y. Maday, E. M. Ronquist, "A reduced basis element method for the steady stokes problem," Mathematical Modelling and Numerical Analysis, vol. 40, No. 3, pp. 529-552, 2006.
Y. Maday, E. M. Ronquist, "A reduced-basis element method," Journal of Scientific Computing, vol. 17, No. 1, pp. 447-459, Dec. 2002.
Y. Maday, E. M. Ronquist, "The reduced basis element method: Application to a thermal ?n problem," SIAM Journal on Scientific Computing, vol. 26, No. 1, pp. 240-258, 2004.

* cited by examiner

METHOD FOR THERMAL SIMULATION

CROSS REFERENCE

This application is related to Provisional Patent Application 61/129,910 filed on Jul. 29, 2008 entitled Method for Thermal Simulation of Semiconductor Chips and Provisional Patent Application 61/199,233 on Nov. 14, 2008 entitled, entitled Method for Thermal Simulation of Structures, both hereby incorporated herein by reference.

FIELD OF THE INVENTION

This invention relates in general to thermal analysis and thermal optimization in a domain structure which can be primarily constructed using building blocks, to achieve optimal design of the structure in terms of the performance, reliability, safety, and power and thermal management. More particularly, the invention relates to thermal simulation of the block-based structures including, but not limited to, semiconductor chips and packages, photonic chips and packages, photovoltaic modules and panels, and battery cells and packs, etc.

BACKGROUND OF THE INVENTION

The methods of the invention can be applied to any block-based structure or system, whose safety, performance and life expectancy are strongly influenced by temperature, in different fields of technology. Only semiconductor chips and battery packs are described in this section.

High temperatures in semiconductor chips caused by heating in individual devices and interconnects have a significant impact on chip performance and reliability. Designers of integrated circuits (ICs) and systems must consider power and thermal management issues to improve performance and reliability. Semiconductor chips typically consist of a large number of devices and interconnects and the number of devices in high performance chips have been growing rapidly to meet increasing demands for sophisticated functions and computational performance. The large number of devices and long interconnect lines between devices, cells, and circuit blocks inevitably induce heating problems. This has become one of the major obstacles to accomplishing cost-effective design of ICs and systems in the semiconductor industry, including not only the conventional digital, analog, RF, and mixed signal CMOS (complementary metal-oxide-semiconductor) technologies but also many other semiconductor technologies, such as BiCMOS (bipolar CMOS), SOI (Silicon-On-Insulator), Bipolar, MMIC (Monolithic Microwave and Millimeter wave IC), and photonic ICs, etc.

FIG. 1 illustrates an example of a silicon IC structure (a silicon chip) 100 that includes two bulk MOS devices 102$a$ and 102$b$ and the first to fourth layer interconnects (metal wires M1-M4) 104$a$-104$d$. The metal contacts 106 connect the device terminals to M1 104$a$, and vias 108 make connections between metal wires from one interconnect layer to another. The devices, as well as the metal wires and vias, dissipate power and therefore induce thermal heating. In addition, heat exchange between devices and metal wires also has an effect on the electronic performance of the chip. Another example of an silicon IC structure 200 based on SOI technology is illustrated in FIG. 2, where on the first silicon island there is only one SOI MOS device 202$a$ but 2 SOI MOS devices 202$b$ and 202$c$ on the second one. Similarly to the structure 100, the devices 202$a$-202$c$, the interconnect layers (metal wires M1-M4) 204$a$-204$d$, the metal contacts 206, and the vias 208 dissipate power and induce thermal heating. Multi-finger structures are also possible but not included in FIG. 1 or 2. Number of the metal layers may vary depending on the complexity and the numbers of devices in the chips.

Other semiconductor IC technologies may have different device and/or layout structures; however, thermal gradients and heat exchange between devices and interconnects are inevitable and become more serious as the numbers of devices and interconnects in a chip increase.

To increase performance, devices and interconnects in semiconductor chips are being scaled down, which leads to a reduction in design thermal margins. This then results in the need for more accurate and efficient thermal simulations at the device, interconnect and package levels as the power consumption and delays are strongly influenced by the local temperature distributions in a chip. It is important for chip designers to predict the local temperatures in devices and circuits and to consider the temperature effects at every stage of the design flow. The evaluated temperatures can then be used as a guideline to achieve thermal aware and cost-effective chip designs. The detailed temperature information in the chip can offer more meaningful reliability analysis as well. For example, based on the predicted temperature distribution in a chip, it may be necessary to change the placement and routing of devices and/or interconnects in the chip to avoid generating hot spots that may overheat the chip and trigger a failure. To accomplish this, an efficient simulation tool for detailed steady-state and transient temperature analysis for semiconductor chip design is essential.

It should be mentioned that the miniaturization of devices into nano-scale dimensions also enhances two major problems in semiconductor industry: pronounced short channel effects in the traditional bulk CMOS technology and long interconnect lines in the conventional planar IC structure. The former gives rise to large leakage power and the channel punch-through characteristics in CMOS devices, and the latter induces long interconnect delays and high power consumption along the long interconnects.

To diminish the short channel effects, SOI (Silicon-on-Insulator) technology has been proposed and successfully implemented in the chip industry. The SOI-based technology however considerably increases self-heating effects because the oxide placed under the device channels to suppress the short-channel effects exacerbates the chip heating problem. To minimize the interconnect delays, 3D stacked packaging architectures have been investigated in recent years. These technologies place the conventional planar circuit blocks or dies vertically to reduce the interconnect lengths and delays but worsens the chip heating problem due to the increase in power density and the difficulty to dissipate heat to the ambient. There have been various approaches to 3D stacking technologies. Some of proposed stacking structures are able to integrate different technologies together, such as CMOS, photonics, MEMs (Micro-Electro-Mechanical Systems), and MMIC technologies, etc.

As the semiconductor technology moves into the nanoscale and 3D-integration structures, chip heating is becoming more serious, and temperature effects on chip performance, reliability, and power and thermal management for design of semiconductor chips and packages are enhanced. Therefore, the need for a method to achieve more efficient and accurate full-chip and full-scale thermal simulation will increase for semiconductor chip design.

Currently, there exist many methods for thermal simulation and analysis in semiconductor chip design. Evaluation of the detailed thermal profiles in semiconductor chips relies on full-scale numerical simulation based on finite element or finite difference methods. These approaches are however computationally time consuming and difficult to use to achieve cost-effective design. For efficient thermal simulation, compact (or lumped) thermal models are usually used. These approaches require assumptions related to heat dissipation paths, temperature profiles, geometry and/or the thermal elements (thermal resistors and capacitors) that are usually modeled by effective dimensions or effective thermal conductivities extracted from simulations or experiments. These approximations may not provide accurate heat flow or heat exchange between devices and/or interconnects in complex multi-dimensional IC geometry. In addition, they are not able to capture high temperature gradients or hot spots in chips.

Thus, there is a need for a method, which is able to offer the temperature profile in a semiconductor chip as detailed as a full-scale numerical simulation with computational time comparable to that of a compact thermal model, for full-chip thermal simulation and analysis in semiconductor chip design.

Furthermore, for electronic IC design, capability of implementing the 3D thermal model in a circuit simulator (e.g., SPICE or other circuit simulators) for efficient electro-thermal simulation of ICs is desirable to be able to predict the local runtime temperatures of devices and interconnects. Such capability will allow chip designers to have access to runtime device and interconnect temperature distributions, including the hot spots in the chips, to accurately take into account runtime thermal effects for a more successful thermally-aware chip design.

The methods of the invention are also idea approaches to thermal simulation of the battery pack which stacks many battery cells or units to achieve the desired electric performance. Battery technology has great influence on many applications, including portable electronics, computers, electric and hybrid electric vehicles, space and aircraft power systems, etc. The internal temperature distributions in stacked battery cells significantly affect performance and reliability of the battery pack. It is necessary to take into account the uneven temperature heating and cooling and non-uniform power flow inside the battery pack to account for the influence of temperature variations over the battery cells. The parameters of the electric elements in the electrochemical model of each cell are in general strongly dependent on local temperature. The non-uniform temperature distribution in the battery pack will thus lead to unbalanced cell impedances and power flow, lower performance and shorter life expectancy. For some batteries, high cell temperature may also induce thermal runaway and cause safety problems. Knowledge of 3D temperature profiles inside the battery pack is therefore crucial not only for optimal battery design but also for optimal battery operation. Consequently, thermal management in the battery and automotive industries has become one of the major issues for optimizing battery operation, performance, safety and life expectancy.

The detailed temperature profiles in the battery packs are currently derived from numerical thermal simulation, which is very time consuming especially in the dynamic cases. To account for temperature influences on the electrochemical model of each battery cell, it needs to couple the numerical thermal simulation with the electrochemical model, which substantially increases the simulation time and is prohibitive for realistic applications. As a result, constant cell temperature is usually assumed to simplify the simulation, which however does not reflect the realistic heat generation, local temperature effects on element parameters of the battery cell electrochemical model, and the heat flow across cells. A considerably more efficient thermal approach, which is able to provide the temperature profile in the battery pack as detailed as a full-scale numerical simulation, will be very useful for electrochemical-thermal simulation to take into account thermal effects for achieving optimal battery design and operation.

SUMMARY OF THE INVENTION

The present invention offers methods for 3D steady-state and transient thermal simulations of block-based structures, such as semiconductor chips, photovoltaic panels, and battery packs, as detailed as full-scale numerical simulation at a computational cost comparable to that of a lumped thermal model. The invention is derived using ideas from "reduced-order modeling" that substantially reduce the numerical degrees of freedom (DOF) required to solve the heat equation. The summary below is presented mainly based on semiconductor chips but the methods can be applied to other block-based structures or technologies.

In the methods of this invention, thermal simulations of circuits or chips are performed in the hierarchical function space rather than physical space. It is not necessary to use lumped thermal elements such as thermal resistors and capacitors. Our reduced-order model does not require any assumption about dimensions, physical geometry, temperature profiles or heat flow paths in a chip, as usually needed in an efficient approach. This approach not only substantially reduces the computational time but also allows the thermal model to work accurately and efficiently in arbitrarily complex geometries in the domain structures to be simulated.

The methods of this invention describe a partitioning of the chip into building blocks and apply reduced-order modeling techniques to each block. For example, in semiconductor chips, these blocks can be as small as one or more devices, or one or more interconnects, or can be as large as standard cells, functional circuit blocks, or dies. Independent function spaces are then used on each partition. The invention includes approaches to couple the solutions between building blocks to ensure thermal continuity on the interfaces. Parameters for the reduced-order thermal models in function spaces for the selected standard building blocks can be collected as a library. Families of the selected building blocks at different levels of granularity for different technologies can then be constructed and stored in the library. For example, for semiconductor technology, the temperatures evaluated using the methods of the invention in the selected block can be as fine as the device junction or channel temperature or as coarse as the average temperature of a cell or a large circuit block. The approach can then be implemented in simulations at different levels of granularity and different stages of the design flow. Similarly, building blocks with different sizes, together with various resolutions, can be stored in the library for thermal simulation of the structure at different efficiency and resolution. For non-standard blocks, the invention includes a technique to generate thermal models for all blocks of a particular type that do not deviate substantially from a standard building block.

The methods also include an approach to efficient electro-thermal simulation in the function space using a circuit simulator (e.g., SPICE), together with appropriate electric models of the components in the structure. In semiconductor technology, for example, these models may include, but not limited to, BSIM models for bulk CMOS and BSIMSOI models for SOI CMOS. Implementing this approach in a circuit simulator will allow chip designers to perform electro-thermal simulations for large functional circuit blocks or chips, at a reasonable computational cost. This will allow them to obtain runtime device junction temperatures and average channel temperatures as well as temperature distributions in interconnects, in order to account for temperature effects on electronic characteristics at different stages of the design flow. For stacked cell structure of a battery pack, the methods can be coupled with the electrochemical models of the battery cells to perform electrochemical-thermal simulation accounting for temperature effects on the electrochemical reaction in each individual cell.

The efficiency and capability of the methods of the invention will allow designers of ICs and systems to achieve more aggressive but reliable chip design, more realistic reliability assessment, and more effective power/thermal management for thermally aware and cost-effective design. The invention can be applied to any block-based structure. For chip technologies, this may include, but not limited to, bipolar, CMOS, BiCMOS, SOI, MMIC, 3D stacking integration, photonic IC, MEMS, and emerging semiconductor technologies. For other technologies using block-based structures, it may include, but not limited to, photovoltaic panels and battery packs, etc. The methods can be implemented in any CAD or EDA tools for simulations, design, optimization and analysis of devices or systems, where temperature strongly affects their safety, performance and/or reliability. The methods can also be implemented in a standalone single-block structure, such as a chip, a circuit block, a device structure, a battery cell or a battery pack, etc.

The claimed invention comprises two major embodiments. A first embodiment comprises method for steady state and transient thermal simulation of a block-based structure or system comprising the acts of: selecting building blocks for a technology; performing a detailed numerical simulation of each selected block; generating interior and boundary thermal modes of a reduced-order model for each block; constructing the reduced-order thermal model of each block using its interior and boundary modes to enforce a coupling of modal solutions between the blocks; storing thermal modes and model parameters in a library for the selected technology; and constructing the reduced-order thermal model for a structure from the generated thermal models for individual blocks in a library. The structure or system can be constructed using a number of standard building blocks. The method of further includes the act of: using the interior and boundary modes to enforce a coupling of modal solutions between the blocks. Additionally the method determines whether the simulation requires one or more non-standard building blocks. The method generates one or more reduced order thermal, models for the non-standard building blocks; and constructs the reduced-order thermal model for the structure from the generated thermal models for individual blocks in the library; selects and stores standard building blocks with different sizes, thermal modes and model parameters with different temperature resolutions in the libraries of a technology for simulation of different levels of resolution and efficiency. The first method generates thermal models for a particular group of non-standard blocks that deviate from a standard one. The method can be applied to the structure materials with nonlinear thermal conductivities and/or specific heats that vary with temperature.

The second method is for steady state and transient thermal simulation of a block-based structure or system including the acts the acts of: selecting building blocks for a technology, performing a detailed numerical simulation of each selected block, generating thermal modes of a reduced-order model for each block, constructing the reduced-order model of each block using a discontinuous method to enforce coupling of modal solutions between the blocks; storing the thermal modes and model parameters in a library for the selected technology; and constructing the reduced-order thermal model for a structure from the generated thermal models for individual blocks in the library. The second method also has a structure or a system that can be constructed using a number of standard building blocks. However, the second method uses a discontinuous method to enforce a coupling of modal solutions between the blocks.

Both methods of can be applied to any block-based system including structures based on silicon, non-silicon, digital, analog, mixed-signal, electronic, photonic, MEMS, battery and photovoltaic technologies, including nanotechnology and/or biotechnologies. A method for steady state and transient thermal simulation of a block-based structure or system comprises the acts of: selecting building blocks for a technology, performing a detailed numerical simulation of each selected block, generating thermal modes of a reduced-order model for each block, constructing reduced-order model of each block using a discontinuous method to enforce coupling of modal solutions between the blocks; storing the thermal modes and model parameters in a library for the selected technology; and constructing the reduced-order thermal model for a structure from the generated thermal models for individual blocks in the library. The structure or a system can be constructed using a number of standard building blocks. The second method uses a discontinuous method to enforce a coupling of modal solutions between the blocks.

In order to implement the two methods described a computer readable medium containing an executable program for performing steady state and transient thermal simulation of a block-based structure or system is used in conjunction with a computer, The first such program performs (the first method) the acts of: selecting building block; generating interior and boundary thermal modes of a reduced-order model for each block; constructing the reduced-order thermal model of each block using its interior and boundary modes to enforce a coupling of modal solutions between the blocks; storing thermal modes and model parameters in a library for the selected technology; and constructing the reduced-order thermal model for a structure from the generated thermal models for individual blocks in a library. The computer readable medium of further comprises the act of using the interior and boundary modes to enforce a coupling of modal solutions between the blocks. The computer readable medium also performs the of act determining whether the simulation requires one or more non-standard building blocks. The medium further performs the acts of generating one or more reduced order thermal, models for the non-standard building blocks; and constructing the reduced-order thermal model for the structure from the generated thermal models for individual blocks in the library.

A second computer readable medium containing an executable program for performing steady state and transient thermal simulation of a block-based structure or system (second method) where the program performs the acts of: selecting building blocks for a technology, performing a detailed numerical simulation of each selected block, generating thermal modes of a reduced-order model for each block, constructing the reduced-order model of each block using a discontinuous method to enforce coupling of modal solutions between the blocks; storing the thermal modes and model parameters in a library for the selected technology; and constructing the reduced-order thermal model for a structure from the generated thermal models for individual blocks in the library. The second computer readable medium determines whether the simulation requires one or more non-standard building blocks. The second method generates one or more reduced order thermal, models for the non-standard building blocks; and constructs the reduced-order thermal model for the structure from the generated thermal models for individual blocks in the library.

The further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

These and other features, aspects, and advantages of the present invention will become better understood with regard to the following description, appended claims and accompanying drawings where:

DETAILED DESCRIPTION OF THE INVENTION

Figure 1:
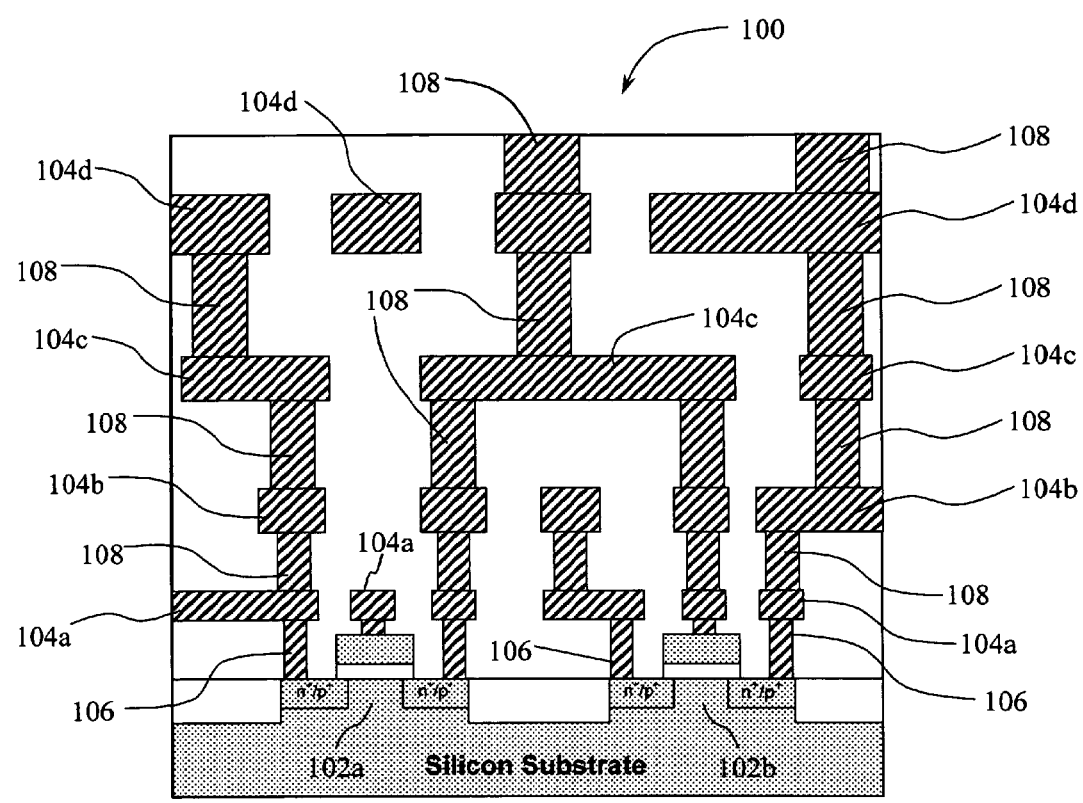
FIG. 1 is a diagram illustrating an example of a silicon chip based on the bulk CMOS technology.
Figure 2:
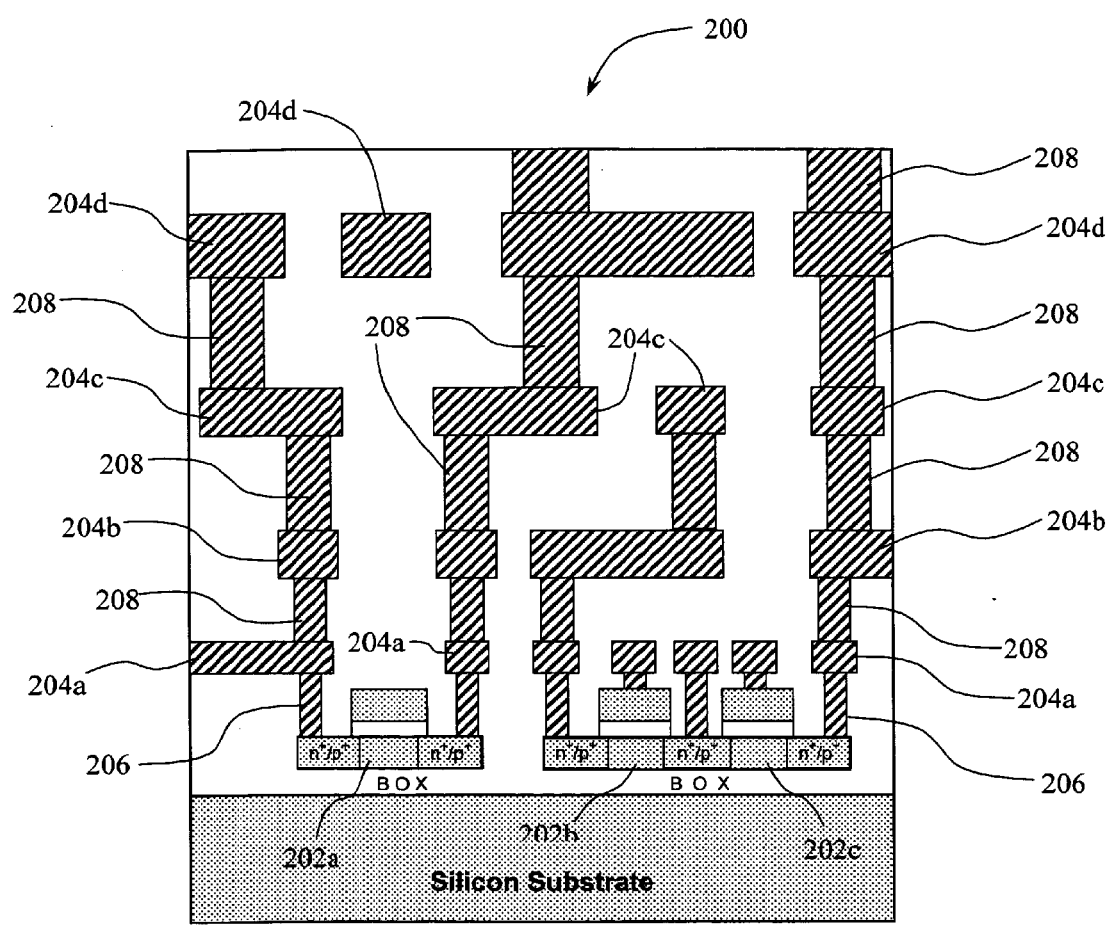
FIG. 2 is a diagram illustrating an example of a silicon chip based on the SOI technology.

Embodiments of the present invention provide two efficient and accurate methods for 3D steady-state and transient thermal simulation in a block-based structure, including but not limited to semiconductor chips and packages, photovoltaic modules and panels, and battery packs, etc. The methods are able to obtain the temperature profile in a structure as detailed as a full-scale numerical simulation at a small fraction of the computational cost that is currently possible. In this description, the procedure, theory and concept of the methods of the invention are presented based on semiconductor chips. These can also be applied to other block-based structures.

The methods can evaluate 3D thermal profiles efficiently at different levels of resolution, as fine as the device junction or average device temperature or as coarse as the average temperature of a standard cell, a large circuit block, or even a die. In addition, the methods can be applied to efficient 3D thermal and electro-thermal simulation in a circuit simulator. Such capability enables designers to have access to detailed runtime temperatures in devices and interconnects and to take into account runtime temperature influences on electronic characteristics and reliability for an optimal and cost-effective chip design. For other technologies, the methods of the invention can also be implemented in various CAD/EDA tools for thermal, electro-thermal, electromagnetic-thermal electrochemical-thermal, electromechanical-thermal and/or electro-opto-thermal simulations.

The term "block-based structure" herein refers to any kind of structures or systems that can be primarily constructed using a number of building blocks. Although a block-based structure mainly consists of standard building blocks, it may also include a small number of non-standard building blocks. The block-based structure includes physical structures based on any technology in any field of science or engineering, including nanotechnology and biotechnology.

The term "semiconductor chip" herein refers to any kind of semiconductor chips for analog and/or digital applications or for electronics, photonics and/or MEMs applications, which may be fabricated or designed using any kind of technologies including, but not limited to, bipolar CMOS, SOI, FET, BiCMOS, 3D stacked IC, MMIC, photonics IC (including imaging IC), and MEMs technologies, etc. It also refers to any emerging technology utilizing the concept of integrating blocks, dies or modules to construct a circuit or system, including 3D stacked-die chips. The term "device" herein refers to a heat dissipating device in a semiconductor chip, including, but not limited to, transistors, diodes, photonic devices, resistors, inductors and capacitors, etc. The term "interconnect" herein refers to any of the media that carries electrical signals or voltage supply from one location to another. It refers to conventional metal wires and non-conventional interconnects including, but not limited to, optical, microwave, nanotube, or nanowire interconnects. It includes but not limited to, on-chip, chip-to-chip, substrate and package interconnects. It also includes the interconnect structures based on, but not limited to, non-conventional 3D packaging architectures such as 3D multi-chip stacked-die technology.

The term "battery pack" herein refers to any kind of energy-storage systems where each system consists of a number of energy-storage cells or units. These may be fabricated using different materials or technologies with different types of electrodes, including nanotechnology or biotechnology. The storage units may include, but not limited to, galvanic cells, voltaic piles, electrolytic cells, fuel cells, biofuel cells, flow cells, betavoltaic cells, and ultrcapacitors, etc.

The term "photovoltaic cells" herein refers to any kind of devices that convert the sunlight into electricity by the photovoltaic effect. The devices may be fabricated using different materials or technologies, including, but not limited to, crystalline, thin-film, single-junction, multi-junction, and nanoparticle structures including nanotechnology or biotechnology.

The invention is based on ideas derived from "reduced-order modeling". The objective of reduced-order modeling is to reduce the degrees of freedom (DOF) needed to numerically solve a system of partial differential equations (PDE's)

by introducing functions for representing the solution that are specifically adapted to the system being solved. After partitioning the structure into building blocks, the process consists of two main steps. In the first, detailed thermal simulations of the individual blocks to be modeled must be performed. From these simulations, a function space is then generated that can be used to represent the temperature profiles in the selected block. There are several different ways to generate the function space including, but not limited to, the Taylor series method, which uses the solution at a point along with its derivatives with respect to the parameter(s) of interest, the Lagrange method, which uses solutions to the system at various parameter values as basis functions, and the proper orthogonal decomposition (POD), which generates a hierarchy of basis functions (or POD modes) from the detailed data.

The second step of reduced-order modeling is to generate equations for obtaining solutions from the function space that approximate the solution to the unsteady heat equation. In this invention, the heat flow equation given below is solved in a physical structure using the reduced-order modeling techniques, $$\rho C_h \frac{\partial T(\vec{x}, t)}{\partial t} = \nabla \cdot k \nabla T(\vec{x}, t) + P_d(\vec{x}, t), \quad (1)$$

where $\rho$ is the material density, $C_h$ is the specific heat, k is the thermal conductivity, T is the spatial and temporal temperature, and $P_d$ is the spatial and temporal power density generated in devices or interconnects. Using weighted integral techniques, the heat flow equation in a 3D domain can be projected onto a finite number of the selected basis functions to generate a model with only a few DOF. With this thermal model, a computationally inexpensive thermal simulation can then be performed that captures essential thermal behavior in the structure.

Figure 3:
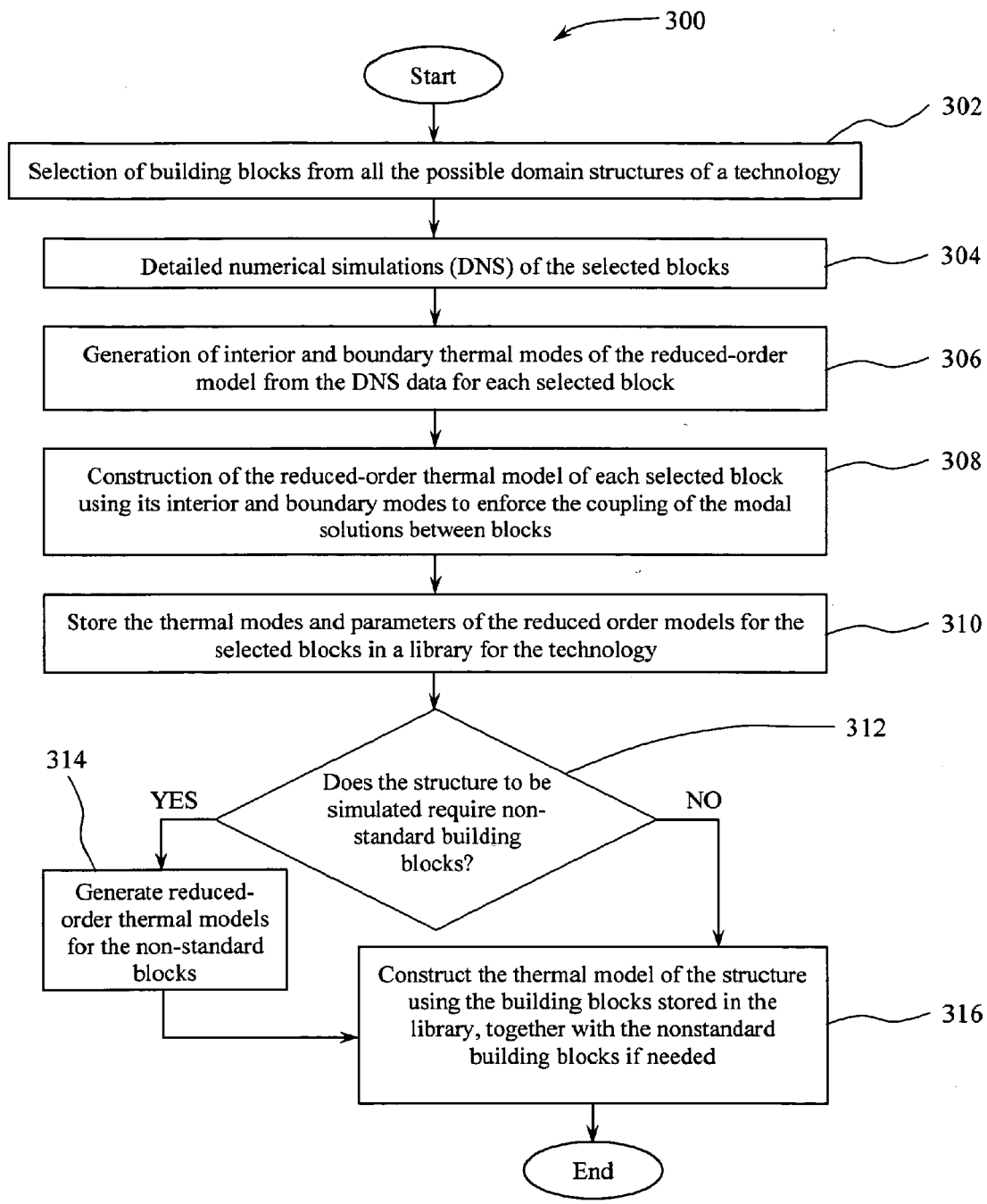
FIG. 3 is a diagram of the flowchart illustrating one of the methods of the invention to construct a reduced-order thermal model for a block-based structure.

A flowchart given FIG. 3 illustrates a method 300 to construct a reduced-order thermal model for thermal simulation of a selected structure for a technology. In step 302, a set of building blocks is selected based on all the possible domain structures of the selected technology. This method of the invention then applies reduced-order modeling to each block individually. Detailed numerical simulation needs to be performed in step 304 on each selected block. The method 300 then continues in step 306 to generate the interior and boundary thermal modes from the DNS data for the reduced-order model of each selected block. The generated interior and boundary modes enforce appropriate coupling of the modal solutions between the adjoining blocks to ensure energy conservation on the interfaces among blocks. In step 308, a reduced-order thermal model for each selected block is constructed, and in step 310 their modes and model parameters are stored in a library for the selected technology.

For example, standard cells or functional circuit blocks in the library of a selected IC technology can be partitioned into several basic building blocks in step 302. The thermal modes for each block can be generated in step 306 from full-scale numerical simulations performed in step 304. In step 308, resolution of the generated thermal model for each block depends on the selected spatial resolution in the DNS carried out in step 304 used to generate the thermal modes of the blocks in step 306. For a more efficient approach, larger-size building blocks (e.g., one or more standard cells, one or more functional circuit blocks, or even as large as dies, depending on the design stage or desired resolution) can be chosen in step 302, together with coarser temperature resolution, to generate coarser thermal models of the blocks. In the regions where steep thermal gradients or hot spots exist, finer-resolution blocks are needed to capture the steep gradients and high temperature spikes in the chip.

With the library created for the selected technology in step 310, the reduced-order thermal model of the domain structure to be simulated can be constructed in step 316 using the building-block thermal models in the library. For some structures, reduced-order thermal models for a small number of non-standard blocks may need to be generated in step 314 to ensure seamless construction of the structure. However, for a block-based structure, the number of the non-standard blocks is very small, and effort for generating their reduced-order thermal models is minimized.

Figure 4:
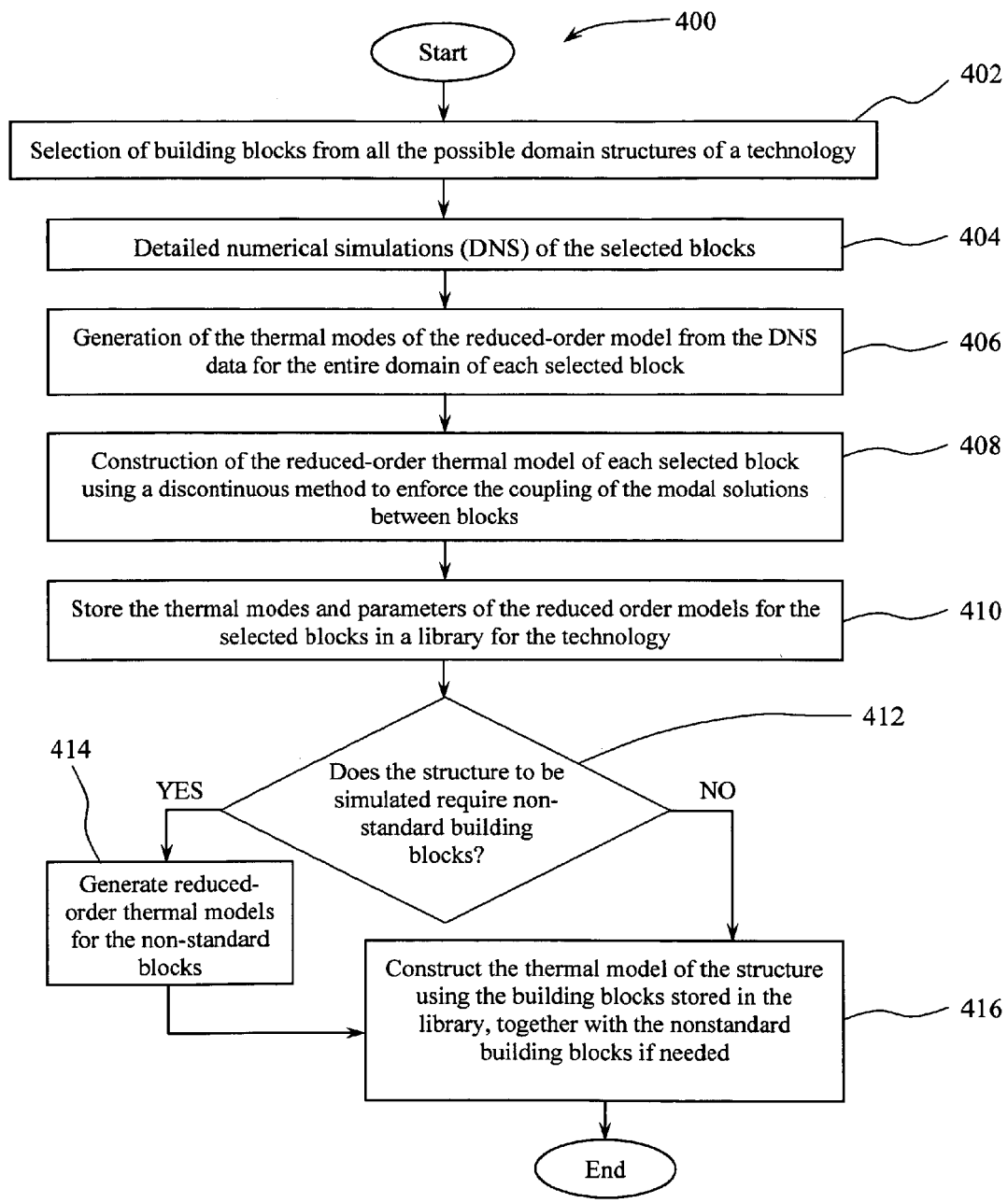
FIG. 4 is a diagram of the flowchart illustrating one of the methods of the invention to construct a reduced-order thermal model for a block-based structure.

FIG. 4 includes a flowchart illustrating the second method 400 to construct a reduced-order thermal model for thermal simulation of a selected structure for a technology. The method 400 is identical to the method 300 except that steps 306 and 308 in the method 300 are replaced by steps 406 and 408 in the method 400. Instead of generating the interior and boundary modes as done in the method 300 to couple the modal solutions between the adjoining blocks, in step 408 of the method 400 the coupling is achieved based on a discontinuous method. In step 406 of the method 400, the thermal modes for the entire domain of each selected block are thus generated.

The thermal model developed using the method 300 or 400 will compactly represent unsteady temperature variations with parameters such as the strength of internal heat sources, boundary conditions, 3D interconnect and device structures, and thermal properties of materials, etc. Using the low-DOF model for each block, a thermal model of a standard cell, a functional circuit block or a chip can then be developed by enforcing thermal continuity at the boundaries of the models for the building blocks.

In the following detailed description, illustration of the procedures for the methods 300 and 400 are given based on the POD to generate the function space on each partition. However, in this invention, any of the reduced-ordered modeling techniques can be applied. A procedure to extract the thermal modes to generate a thermal model for a single block is first described below. Methods for coupling the thermal modes between blocks are then presented, which ensure the thermal continuity on the interfaces between the selected blocks in a multi-block structure. Examples are included to illustrate the procedure of the mode generation for a single-block and a multi-block structure. The illustrations and demonstrations are presented in semiconductor structures. The concepts, theory and procedure can be applied to other block-based structures.

A set of standard building blocks need to be carefully selected first for each technology, as stated in steps 302 and 402 for the methods 300 and 400, respectively. Appropriate blocks can then placed together to form a cell, functional circuit block or chip. Different technologies may consist of different types of standard building blocks. For example, for the digital CMOS technology, the standard blocks may include, but not limited to, one or more devices with single or multi-finger structure, one or more interconnects, one or more devices with one or more interconnects, one or more standard cells (such as NOT, AND, OR, NAND, NOR, XOR, XNOR, flip flops, adders, etc), one or more functional circuit blocks, or and/or a mix of any combination of these selected blocks, etc.

Before generation of the function spaces for the selected set of the building blocks, detailed thermal data of temperature profiles for each block need to be generated as stated in steps 304 and 404 for the methods 300 and 400, respectively. These data must, as much as possible, encompass the same range of boundary and power dissipation conditions that each selected building block will experience as a component of a cell, circuit block or chip. One has to ensure that the boundary temperature profiles and power dissipation of each selected block are similar to those that occur in a full circuit block. This thermal data will then be used in the next step to generate a function space for each selected block.

Figure 5:
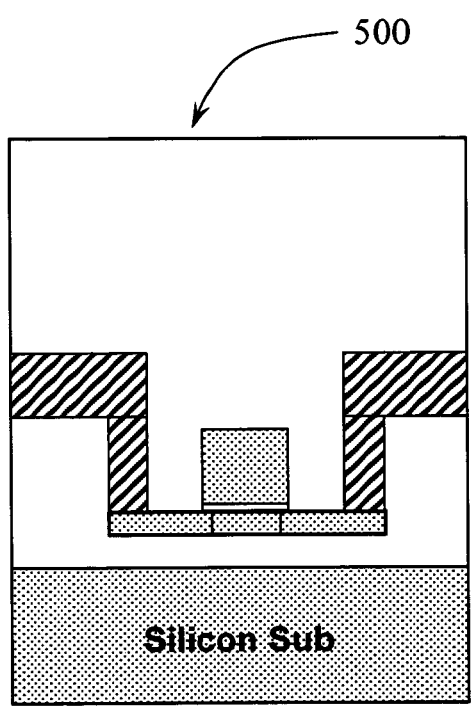
FIG. 5 is a SOI device block used to illustrate the procedure to generate the thermal modes of a single-block structure.
Figure 6:
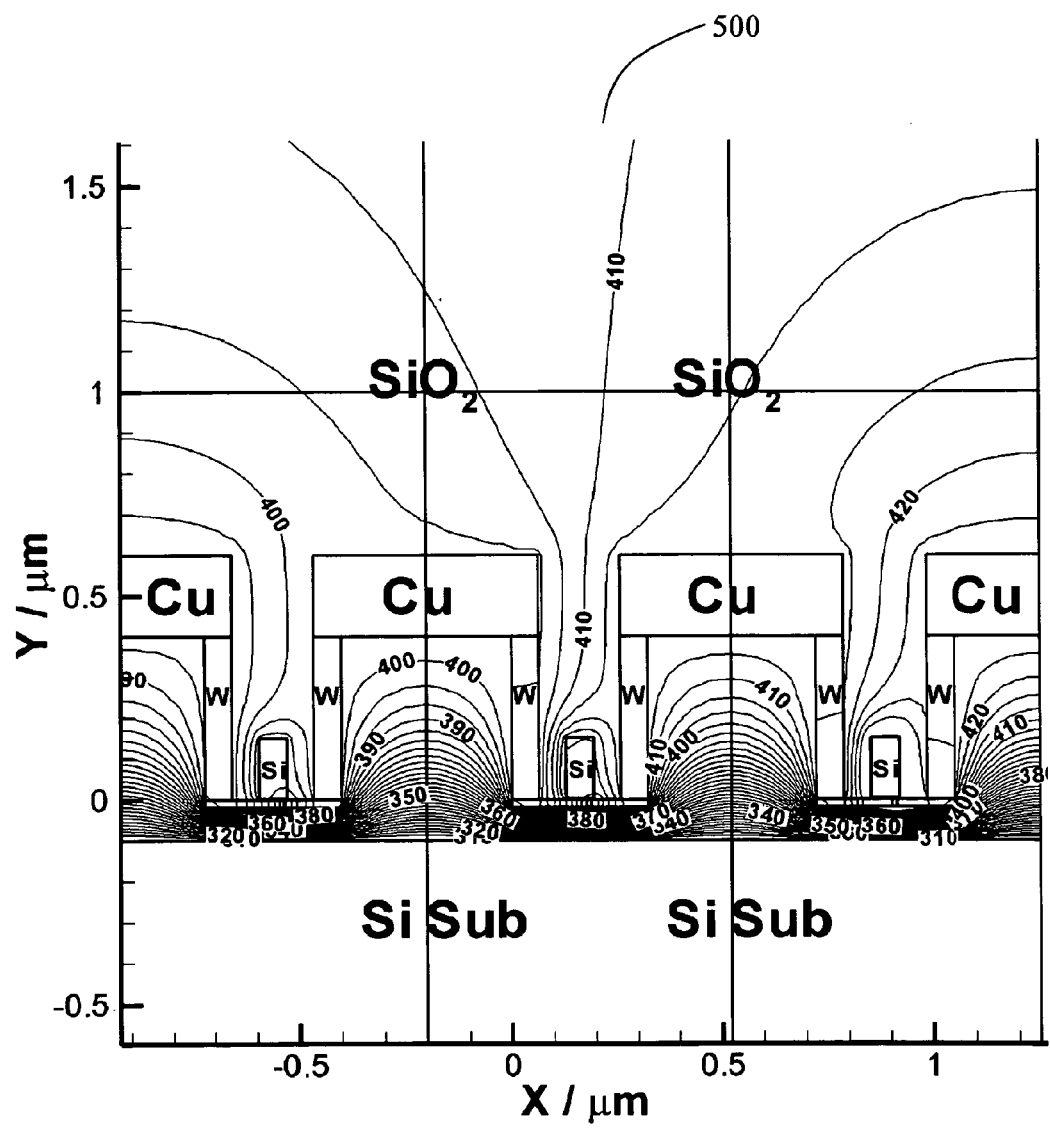
FIG. 6 includes a three-block structure and temperature profiles in the structure. The temperature is in Kelvin.

A single-block structure 500 for a SOI device block with a gate length of $L_g$=65 nm, shown in FIG. 5, including metal contacts and the first interconnect layer (metal wires M1) is used here to illustrate a possible setup and procedure for generating the POD thermal modes of the entire domain in a single block structure. The thermal conductivities used in the simulation include: $k_{ox}$=1.4 W/(mK) in dielectrics (oxide), $k_{si}$=63 W/(mK) in the silicon island and the poly gate, $k_{sub}$=148 W/(mK) in the silicon substrate, $k_w$=174 W/(mK) in the tungsten metal contacts and $k_{co}$=401 W/(mK) in the copper interconnects. Instead of performing a DNS of the selected structure 500, simulations of three identical single device blocks with metal wires M1 connected to each other are performed, as shown in FIG. 6 where the selected block structure 500 is placed in the middle. Different levels of heat flow can be enforced on the boundaries of the middle block (structure 500) if various power dissipations in the SOI devices of these 3 blocks are implemented. The numerical data from the middle block are then used to generate the POD modes for the entire domain of the selected single-block structure 500. This setup ensures that heat flux via the left and right boundaries of the selected block at the center is similar to realistic operating conditions influenced by various heat dissipations in the neighboring devices. To simplify the demonstration, the joule heat in the metal wires is not included. Inclusion of the heating along the metal wires is however straightforward. In addition, it is assumed that there is no higher-level metal wire, and the adiabatic boundary condition is assumed on the top. To be more realistic, heat flux via the top boundary should be considered, and interconnect building blocks for metal wires M2, such as interconnects 104b of chip 100 or 204b of chip 200, can be placed on top of the 3-device structure to enforce appropriate boundary heat flux. This can be achieved without much difficulty.

There is only one device on the silicon island in the selected device block. However, the selected SOI device block may include one or more devices on a silicon island and several metal contacts with or without metal wires M1. For a multi-finger, multi-gate or FinFET device block, more complicated geometry will be involved. It should be noted that the above setup for generation of the thermal modes for the selected block is not unique. Different setups may be needed for different types of building blocks. Any setup, which is able to cover a range of all possible boundary and power dissipation conditions in realistic circuit operation, can be used.

FIG. 6 also shows a thermal solution on the three coupled SOI MOSFET structures with power strengths of 0.8, 1.0 and 1.2 mW/um applied to the devices from left to right, obtained from DNS. In this example, a narrow thermal source with a width of 10 nm is assumed to be located near the channel-drain junction in each device. However, this assumption is not necessary, as any source profile can be incorporated to the current framework. The boundary conditions of the simulation are adiabatic on the top and the left and right sides and a fixed temperature of 300K on the bottom of the silicon substrate. Several cases were run in DNS using the distribution of power source strengths shown in the following table.

| Case # | Device 1 (mW/µm) | Device 2 (mW/µm) | Device 3 (mW/µm) |
|---|---|---|---|
| 1 | 0.1 | 0.5 | 0.1 |
| 2 | 0.5 | 0.1 | 0.5 |
| 3 | 0.6 | 0.6 | 0.6 |
| 4 | 0.8 | 0.9 | 0.8 |
| 5 | 0.9 | 0.8 | 0.9 |
| 6 | 1.1 | 1.4 | 1.7 |
| 7 | 1.7 | 1.4 | 1.1 |
| 8 | 0.3 | 1.2 | 1.8 |
| 9 | 1.8 | 1.2 | 0.3 |
| 10 | 1.2 | 0.3 | 1.2 |
| 11 | 1.2 | 1.8 | 1.2 |
| 12 | 1.5 | 1.5 | 1.5 |

This set of twelve cases is used as the discrete data for obtaining the POD modes of the center block. This will ensure that the heat flux on the interfaces between the device blocks and the power strength will reasonably cover the range in the test cases.

The function space for each building block is constructed from the detailed numerical simulations performed on the building block. The basis functions for the function space are called "POD modes" and given the symbol φ. The POD generates a function space with the goal of representing the detailed simulations with as few functions as possible. To do this, the POD modes maximize the mean square inner product of the thermal solutions with the POD mode $$\frac{\left\langle \left( \int_\Omega T(\vec{x},t)\varphi d\Omega \right)^2 \right\rangle}{\int_\Omega \varphi^2 d\Omega},$$

where Ω is the physical domain and the angled brackets ⟨ ⟩ indicate an averaging process. The average is taken over all of the thermal solutions obtained from the numerical simulation for the building block structure. If these solutions are unsteady, then this is a temporal average. This is not necessarily the case however. The average could include steady thermal solutions obtained at different power levels or different boundary conditions as well. In the following, we will use the averaging in this general sense, and t is then a discrete variable indicating the different temperature solutions.

To solve the above maximization problem, variational calculus is used. This results in the following Fredholm equation for the mode shapes.

$$\int_{\vec{x}'} R(\vec{x},\vec{x}')\vec{\phi}(\vec{x}')d\vec{x}' = \lambda \vec{\phi}(\vec{x}), \qquad (2)$$

where $R(\vec{x},\vec{x}')$ is an autocorrelation function given by $$R(\vec{x},\vec{x}') = \langle \vec{T}(\vec{x},t)\vec{T}(\vec{x}',t) \rangle.$$

Because the autocorrelation function is symmetric, this problem generates an orthogonal series of POD modes similar to an algebraic eigenvalue problem. In fact for discrete temperature data, the autocorrelation function is a matrix relating the average correlation of the data at different locations and the POD modes are simply the eigenfunctions of that matrix. The first POD mode satisfies the maximum property given above. The next POD mode is orthogonal to the first, and satisfies a similar maximum property except that it maximizes against the remainder of the temperature that cannot be captured using the first mode. The higher modes are similar. In this way, a hierarchy of functions is generated that can represent the transient or parametric temperature variations in the building block with as few DOF as possible. The eigenvalues of the Fredholm equation, $\lambda$, represent the mean energy captured by each mode, $\phi$.

In the methods of this invention, the numerical solutions are obtained on a discrete mesh and the Fredholm equation in Eq. (2) is actually an algebraic eigenvalue problem. The POD modes are then discrete data represented on the same computational grid as the original numerical solutions. Once these modes are obtained, they can be used to represent the temperature solution compactly as $$T(\vec{x}, t) = \sum_{i=1}^{M} a_i(t)\varphi_i(\vec{x}), \quad (3)$$

where M is the number of modes used to represent the solution. The expansion coefficients $a_i$ are functions of time and/or of the problem input parameters including heat sources and boundary conditions. These coefficient need to be determined, which will be described in the next step. For a heat flow problem, typically a very small number of modes are needed to capture the temperature profile (see the results from the example below). This is however dependent on the spatial variability of the temperature solutions on the block.

In the method 300, to generate the interior and boundary functions in step 306, POD can be applied individually to the interior data on the volume and to the boundary data on the boundary surface in Eq. (2), from the detailed numerical simulations. This will then generate interior and boundary POD modes separately, which will be described in more detail later. In step 406 of the method 400, POD modes are generated from Eq. (2) over the entire domain.

Continuing with the example started above, the generation of the POD modes for the domain of each building block is done using Eq. (2), with the averages being taken over all of the cases discussed above. POD modes need to be generated for each selected block. The number of modes needed for construction of the thermal model for each block is based on the magnitude of the eigenvalues of the modes. For example, in this demonstration of generating the thermal modes of the center SOI device block (the structure 500) in FIG. 6, the first 6 eigenvalues for the single-device block in order of magnitude are $4.85 \times 10^6$, $4.26 \times 10^3$, $1.92 \times 10^2$, 93.7, $2.04 \times 10^{-12}$ and $2.98 \times 10^{-18}$ $K^2$. The first 4 modes contain nearly all energy and are able to capture full response of the center block for all of the cases run.

To create a model of the temperature response in a selected building block structure to variations in power dissipation and boundary conditions, the heat flow equation given in Eq. (1) is used with the POD modes to generate a compact model. A finite element method can be used to generate the model. One possible approach is based on the Galerkin weighted integral form of the heat flow equation, $$\int_{\Omega} \left( \varphi \frac{\partial \rho C T}{\partial t} + \nabla \varphi \cdot k \nabla T \right) d\Omega = \quad (4)$$

$$\int_{\Omega} \varphi P_d(\vec{x}, t) d\Omega - \int_{\Gamma} \varphi(-k\nabla T \cdot \vec{n}) d\Gamma, \forall \varphi,$$

where $\Gamma$ and $\vec{n}$ are the boundary surface and outward normal vector of the building block domain. Because the modes are known, all of the spatial integrals in this equation can be pre-evaluated which then results in an M-dimensional system of ordinary differential equations for $a_i$ in Eq. (3) whose matrix form is given as $$\text{diag}[c'_{1,1} c'_{2,2} \ldots c'_{M,M}] \frac{d\vec{a}}{dt} + \begin{bmatrix} g'_{1,1} & g'_{1,2} & \cdots & g'_{1,M} \\ g'_{2,1} & g'_{2,2} & \cdots & g'_{2,M} \\ \vdots & \vdots & \ddots & \vdots \\ g'_{M,1} & g'_{M,2} & \cdots & g'_{M,M} \end{bmatrix} \vec{a} = \vec{P}. \quad (5)$$

where the matrix and vector elements, $c'_{i,j}$ and $g'_{i,j}$, and are constant, and $g'_{i,j} = g'_{j,i}$. Eq. (5) describes thermal information in the block in a small DOF function space, where $c'_{i,j}$ and $g'_{i,j}$ are the elements of the thermal capacitance and conductance matrices, respectively. These are given by $$c'_{i,j} = \int_{\Omega} \rho C \phi_i^2 d\Omega, \; g'_{i,j} = \int_{\Omega} k \nabla \phi_i \cdot \nabla \phi_j d\Omega. \quad (6)$$

The vectors $\vec{a}$ and $\vec{P}$ denote the temperature and power dissipation, respectively, in the function space. The temperature profile of the selected block can then be calculated from Eq. (3), which offers thermal behavior, as detailed as that from DNS, described by the selected M modes for the block.

If the thermal conductivity k varies with temperature, the heat diffusion problem becomes nonlinear. In the dynamic cases, the thermal capacitance density $\rho C_h$ may also vary with temperature. There are several approaches to incorporating these nonlinearities in the reduced order model. If the variations in thermal conductivity and thermal capacitance density with temperature can be fit with polynomial functions, the basic procedure of substituting the expansion given in Eq. (3), into the weighted integral form given by Eq. (4) can be followed. Instead of resulting in a linear set of ordinary differential equations as shown in Eq. (5), differential equations will be obtained with nonlinear combinations of the components of the vector $\vec{a}$ and its time derivative. For more complex temperature variations, the procedure of "empirical interpolation" (M. A. Grepl, Y. Maday, N. C. Nguyen, and A. T. Patera, "Efficient reduced-basis treatment of nonaffine and nonlinear partial differential equations," Mathematical Modeling and Numerical Analysis, vol. 41, No. 3, pp. 575-605, 2007.) can be used to incorporate the nonlinearity.

The above procedure for construction of the reduced-order model from Eq. (4) is only for the singe-block standalone structure, which is applied to the single-block structure 500 to demonstrate the accuracy and efficiency of the reduced-order model. For multi-block structures, some modifications are needed and will be presented after the numerical demonstration of the single block structure.

It should be emphasized that, although the thermal modes contain all the data required to evaluate T(x,t) at every point in space using Eq. (3), it is not necessary to use all of this data. One can store the values of the POD modes at a small number of points of interest so that the temperature can rapidly be calculated at these points. For an arbitrary power function, it seems that Eq. (4) would require integration of the mode over the domain; however, the source power function can also be represented using POD modes in a manner similar to that shown in Eq. (3). Thus all integrals can be pre-evaluated and no calculations require spatial POD data. This will substantially save memory space and computational effort during the simulation.

Figure 7:
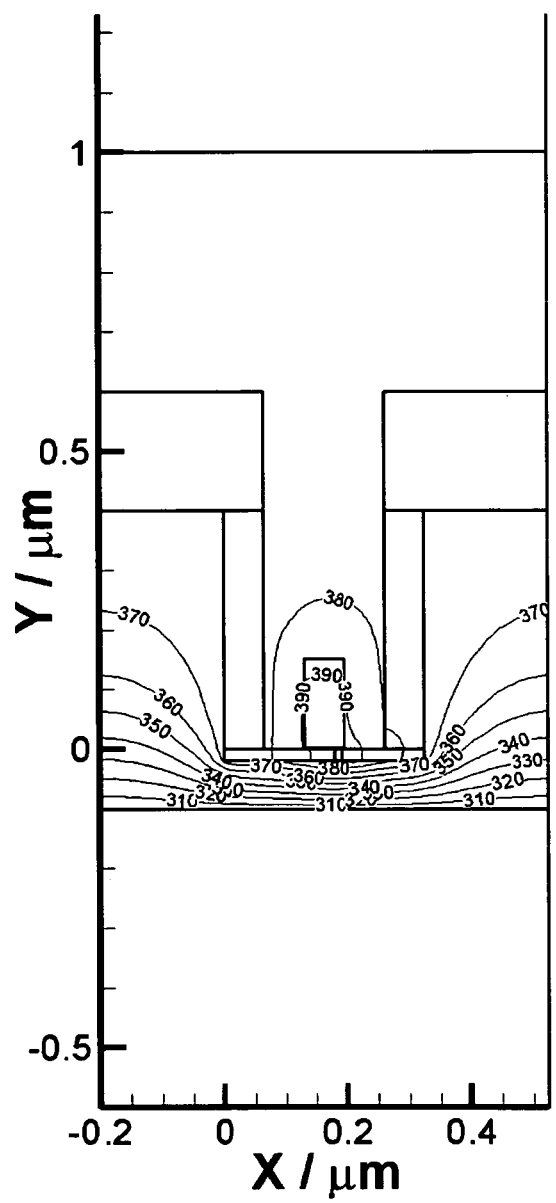
FIG. 7 illustrates temperature profile in the single device block
Figure 8:
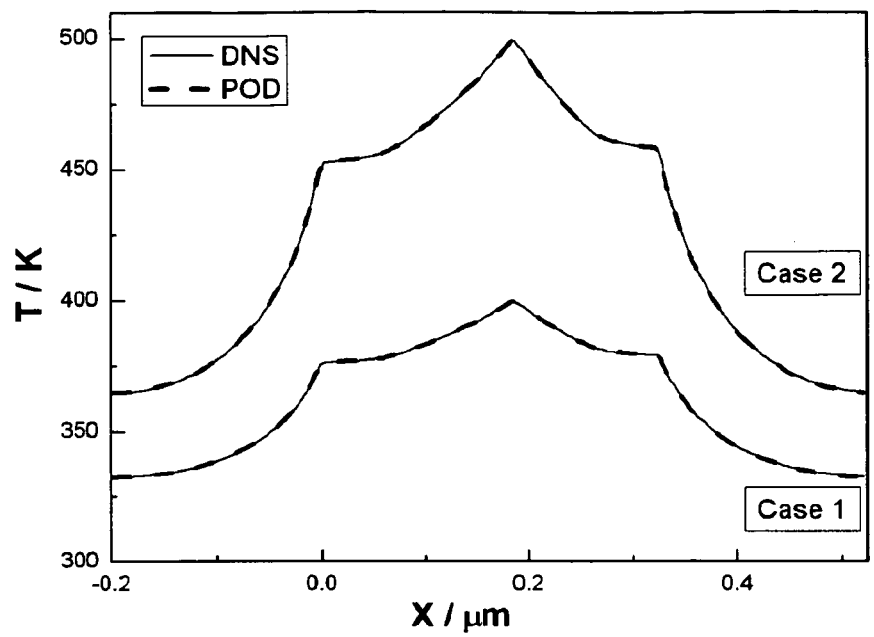
FIG. 8 illustrates the comparison of thermal profiles derived from DNS and the POD thermal model for the single SOI device block shown in FIG. 7 along y=−0.01 μm.
Figure 9:
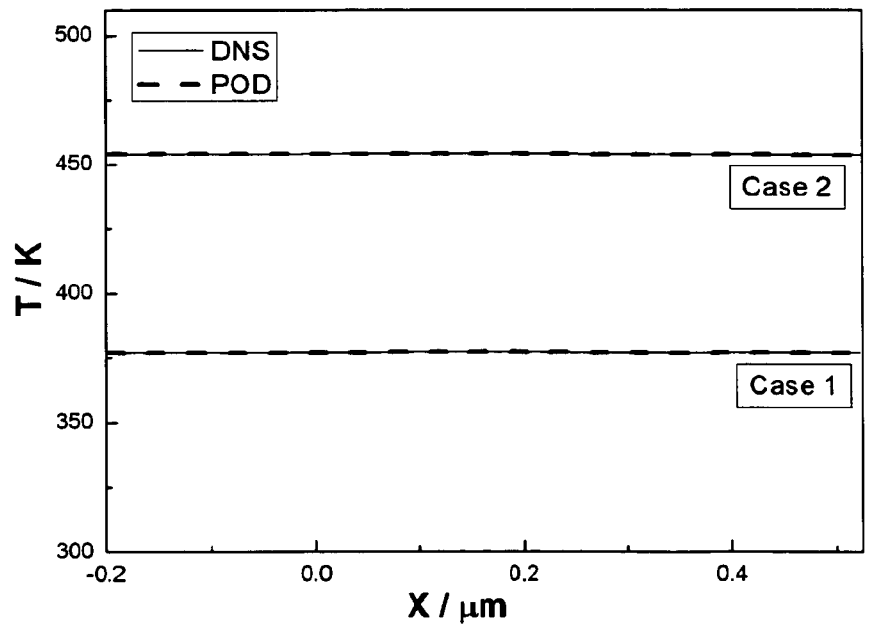
FIG. 9 illustrates the comparison of thermal profiles derived from DNS and the POD thermal model for the single SOI device block shown in FIG. 7 along y=0.5 μm.

Continuing with the above example of the single-block structure 500, because the problem is steady, plugging the POD modes into Eq. (4) results in linear equations. We model a single device structure identical to the center block in FIG. 6 with completely different boundary conditions from those used to generate the POD modes of the center block. The boundary conditions for the single device structure 500 in the simulation include (a) top and left boundaries of the structure are adiabatic, (b) the bottom of the substrate is fixed at 300K and (c) convective heat transfer boundary conditions are applied on the right boundary, $-k\, dT/dx = h(T-300K)$, where h is a convective heat transfer coefficient. On the right boundary, $h=0.001\ \mu W/(\mu m^2\ K)$ above the metal wire and $h=0.01\ \mu W/(\mu m^2\ K)$ below the metal wire. On the right metal boundary, $h=0.5\ \mu W/(\mu m^2\ K)$. FIG. 7. illustrates the temperature distribution in this device block with a power of 0.8 mW/μm applied at the device junction. FIGS. 8 and 9 show the horizontal temperature profiles through the single device block structure 500 of FIG. 7 at the level along y=−0.01 μm under the gate (where the hot spot is located) and y=0.5 μm through the center of the metal wires. two different power strengths are applied: Case 1, 0.8 mW/μm and Case 2, 1.6 mW/μm. Curves for DNS data are shown with solid lines, and curves from the POD model are shown with dashed lines. The POD curves fall exactly on top of the solid curves. Thus, variations of temperature with power and boundary conditions are perfectly captured by the POD model.

Figure 10:
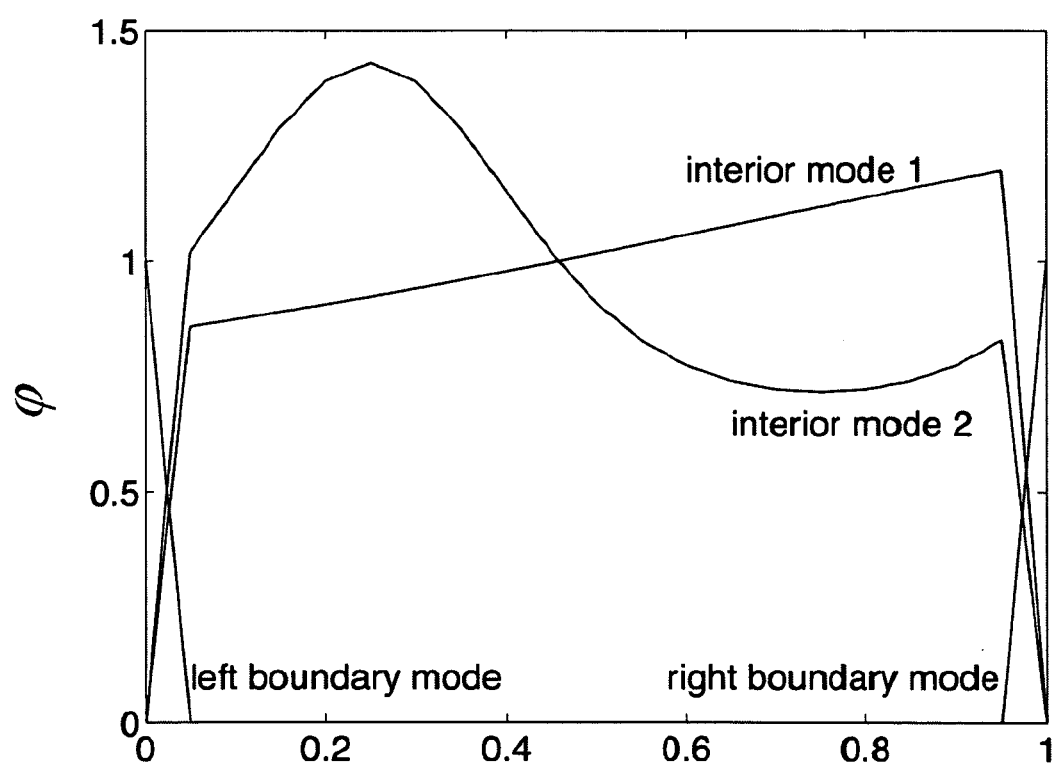
FIG. 10 illustrates an example of left and right boundary modes and two interior modes for a one-dimensional problem.

Eq. (5) represents a single-block standalone structure. When considering a multi-block structure, the POD modes across the adjoining blocks need to be coupled to ensure that heat flux and temperature on the interfaces between blocks are continuous. To achieve this, this invention includes two methods to couple the modal solutions between building blocks, as indicated in steps 306 and 308 of the method 300 and in steps 406 and 408 of the method 400. The method 300 requires that the temperature be continuous between devices. This is the more difficult case because the form of the basis functions (or the POD modes) along the block boundary must be the same for the blocks that will be coupled together. To accomplish this, we will modify the POD procedure described above for the single block structure so that it produces "interior" functions and "boundary" (or "interface") functions in step 306. The interior functions are defined such that they are nonzero only on the interior grid points of the block domain and zero on the boundary grid points. The boundary functions are exactly the opposite. FIG. 10 shows a 1D example of such a division. Four modes are shown, a left boundary mode which has the value one on the left boundary and zero elsewhere, a right boundary mode which has the value one on the right boundary and zero elsewhere, and finally two interior modes. In 1D, the boundary modes can only be these simple functions, but in 2D and 3D, the boundary modes can have spatial variation along the boundary surface. The second method 400 for inter-block coupling does not require continuity of the temperature at element boundaries. In this case, the POD can be applied directly on the entire volume, and there is no need to divide into boundary and interior functions. These two methods (embodiments) are described below.

To generate the interior and boundary functions in step 306 of the method 300, POD can be applied individually to the interior data on the volume Ω and to the boundary data on Γ in Eq. (2), from the detailed numerical simulations. This will then generate function spaces for the boundaries and the interiors separately. The boundary modes will optimally describe the temperature variation along the interface between the adjoining blocks. The interior modes will optimally capture the values of the temperature in the interior of the block but are zero on interface boundaries. This approach increases the number of modes needed to describe the temperature solution but will allow inter-block coupling to be handled easily.

In step 308 of the method 300, the boundary (or interface) modes and interior modes of a system consisting of several coupled blocks can be directly plugged into Eq. (4) to obtain a reduced order model of the system. The matrix structure associated with the division of modes into interface modes and interior modes will result in a symmetric sparse system for the blocks similar to Eq. (5) except with coupling to adjacent blocks through the boundary modes. For example, considering two coupled device blocks arranged similarly to the left and center blocks in FIG. 4, each with three interior modes and two boundary modes on the interface boundary, the thermal conductance matrix structure would be $$\begin{bmatrix} B_l & C_{1,l} & 0 & 0 & 0 \\ C_{1,l}^T & A_1 & C_{1,r}^T & 0 & 0 \\ 0 & C_{1,r} & B_m & C_{2,m} & 0 \\ 0 & 0 & C_{2,m}^T & A_2 & C_{2,r}^T \\ 0 & 0 & 0 & C_{2,r} & B_r \end{bmatrix}, \quad (7)$$

where each entry is a block matrix with the elements determined in a manner similar to Eq. (6). There are therefore total twelve thermal modes in this system. The B (2×2) matrices are the coupling of the left, middle and right interface modes to themselves. The A (3×3) matrices are the coupling of the interior modes on blocks 1 and 2 with themselves. The C (2×3) matrices are the coupling between the interior and interface modes. In a similar manner, a thermal capacitance matrix will also be generated. Unlike in Eq. (5), the thermal capacitance matrix will not be purely diagonal because the boundary and interior modes will not be orthogonal.

The sparse matrix in Eq. (7) can be inverted with standard sparse solvers like a conjugate gradient method or an algebraic multigrid method. Because the equations are coupled only locally, parallel computing can be used to perform computations with many millions of blocks (for steady problems possibly using PetsC, for example). If unsteady simulations are to be formed, an implicit time advancement scheme can be used. Explicit schemes cannot be used in a multi-block structure because the thermal capacitance matrix will not be purely diagonal. However for the implicit case, the equations to be solved will be strongly diagonally dominant and a simple Jacobi iterative scheme will converge rapidly and parallelize with high efficiency. In a structure, such as a semiconductor chip or a photovoltaic cell/module/panel, part or all of whose heat sources are provided by the electric circuit model(s), when performing electro-thermal simulation of the structure, it may be more practical to implement the POD method in a circuit simulator. This will be described later. For a battery pack, the POD method can be coupled with the battery cell electrochemical models to perform electrochemical-thermal simulation.

In the second method 400 for generating the fully coupled thermal model for a multi-block structure, a discontinuous method, such as the discontinuous Galerkin finite element method, can be used. In this case, the temperature is allowed to be discontinuous at element boundaries, but a "penalty" term is added to weakly enforce temperature continuity. A single heat flux between blocks is evaluated using an average of the heat fluxes from the right and left side. With this approach, the function space does not need to be modified, but Eq. (4) needs to be modified using, for example, any of the techniques in [Arnold, et al. *SIAM J. Numer. Anal.*, vol. 39, pp. 1749-1779, 2002] to allow for discontinuities in the temperature. This approach has some significant advantages in that by eliminating the interface modes between blocks. A purely diagonal thermal capacitance matrix (orthogonal modes) is thus retained. For unsteady problems, this will allow purely explicit time advancement schemes to be used and will have very high parallel efficiency.

Figure 11:
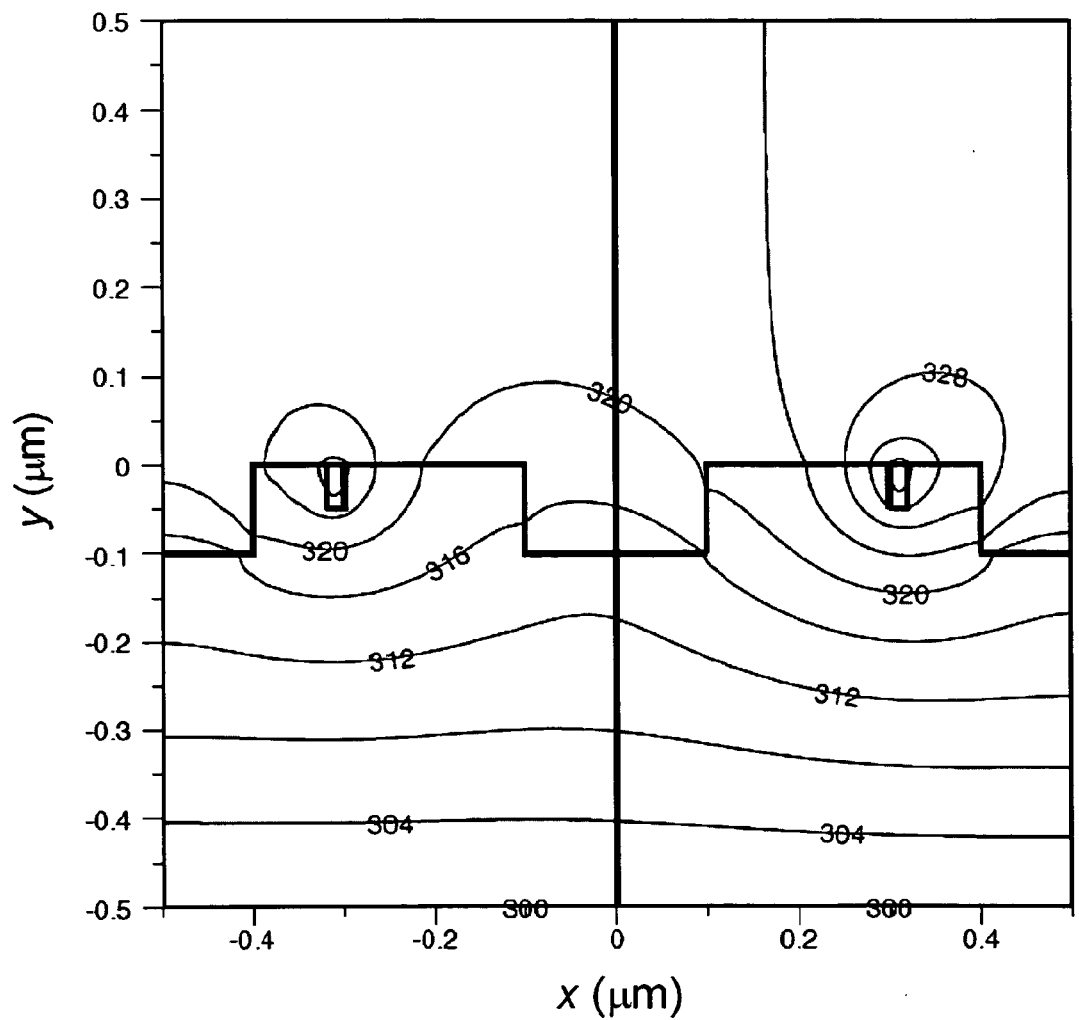
FIG. 11 includes a structure comprising 2 identical coupled semiconductor blocks and temperature profiles in the structure.

Below a simple example is given to demonstrate the process of generating interior and interface modes in the method 300 for a semiconductor structure that contains 2 identical blocks given in FIG. 11. This simplified two-block structure resembles a bulk CMOS structure including a pMOS and nMOS block without the poly gates and metal interconnects. The line from left to right through the middle of the structure divides the structure into dielectric (above) and silicon (below) areas, where the p and n doped regions in the silicon area are not indicated and treated as the materials with the same thermal conductivity. The dimensions shown in the figure are in micrometers and temperature in Kelvin. The small 20 nm×50 nm rectangular in each block denotes the location of the uniform heat source. Any source profile can be incorporated to the current framework, but the uniform source was chosen for expediency in making the example results. The boundary conditions along the bottom of the domain are a Dirichlet boundary condition with the temperature fixed at 300K. On the left, right, and top of the domain, adiabatic boundary conditions are enforced.

To generate data for the POD modes, several steady solutions derived from DNS in step 304 were obtained using the distribution of source strengths shown in the following table. In the simulation, $k_{si}$=63 W/(mK) in the silicon area and $k_{ox}$=1.4 W/(mK) in the dielectric area. The temperature profile shown in FIG. 9 is for Case 1.

| Case # | Device 1 (mW/μm) | Device 2 (mW/μm) |
|---|---|---|
| 1 | 1 | 1.5 |
| 2 | 1.2 | 1.6 |
| 3 | 1.4 | 1.7 |

Figure 12:
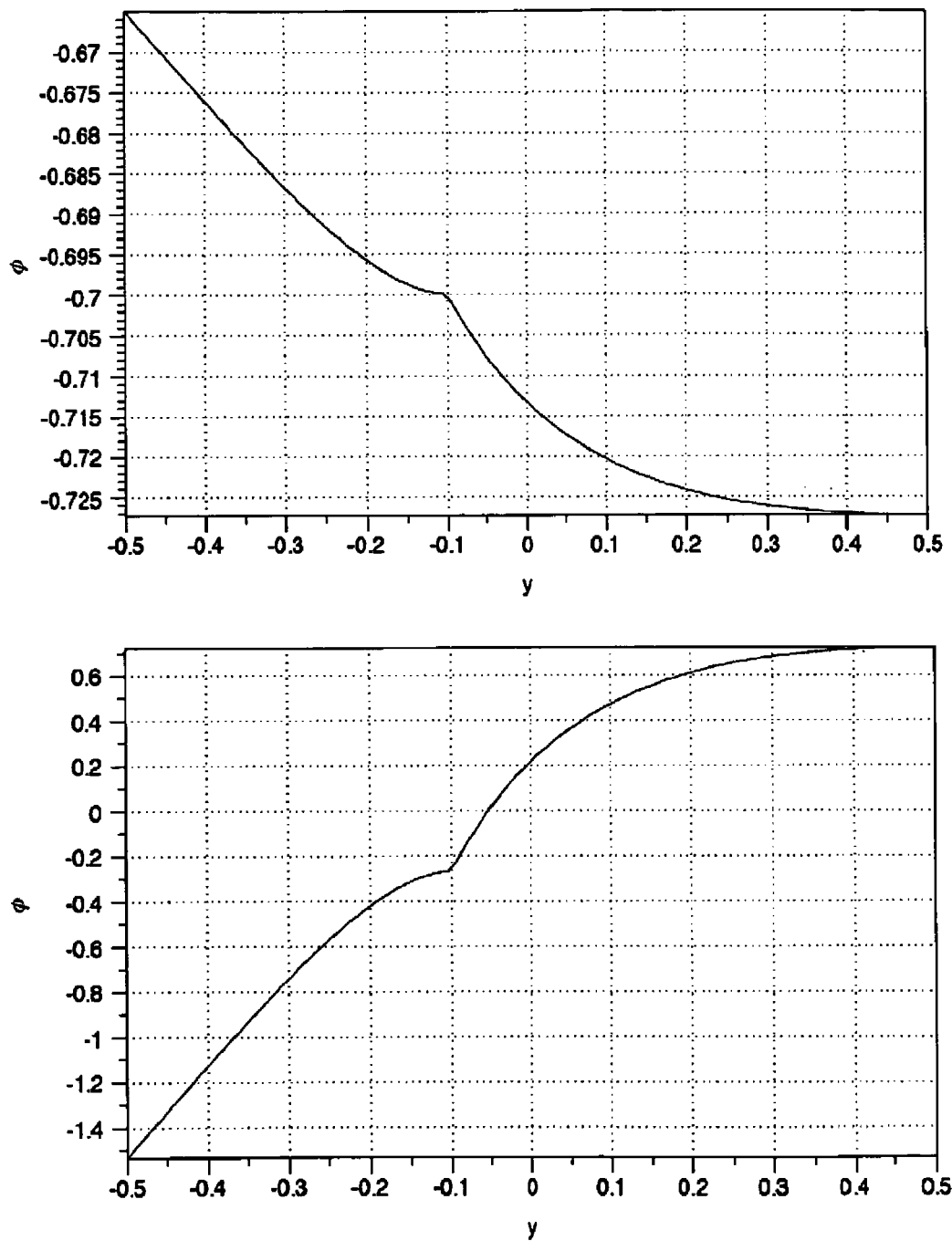
FIG. 12 illustrates the POD modes on the interface between the two-block structure given in FIG. 11.

The next step 306 is to generate the POD modes, φ. This is done using Eq. (2), with the averages being taken over all of the cases discussed above. For this particular case, three sets of modes are generated: interior modes on the left block, boundary modes for the surface between the two blocks, and interior modes for the right block. The eigenvalues for the first two left block modes are $2.306 \times 10^5$ and 3.896 $K^2$. Beyond that, the magnitudes are all zero to machine accuracy. This indicates that the first two modes can capture all of the temperature profiles. The modes and eigenvalues on the right block are similar. The interface modes have eigenvalues of $1.017 \times 10^6$ and 10.66 $K^2$. Beyond the second mode, the eigenvalues are again all zero to machine accuracy. To illustrate the interface modes, the profile of the first two modes along the boundary between the blocks is shown in FIG. 12. These are calculated using a 1D POD along the boundary between the two blocks.

In step 308, the two interior and two boundary modes for left block are plugged into Eq. (4) to generate a reduced-order thermal model for the left block. This is repeated for the right block. The models of these two blocks are then placed together in step 316 to construct the thermal model for the two-block structure. Because the problem is steady, this results in linear equations for the temperature expansion coefficients.

Figure 13:
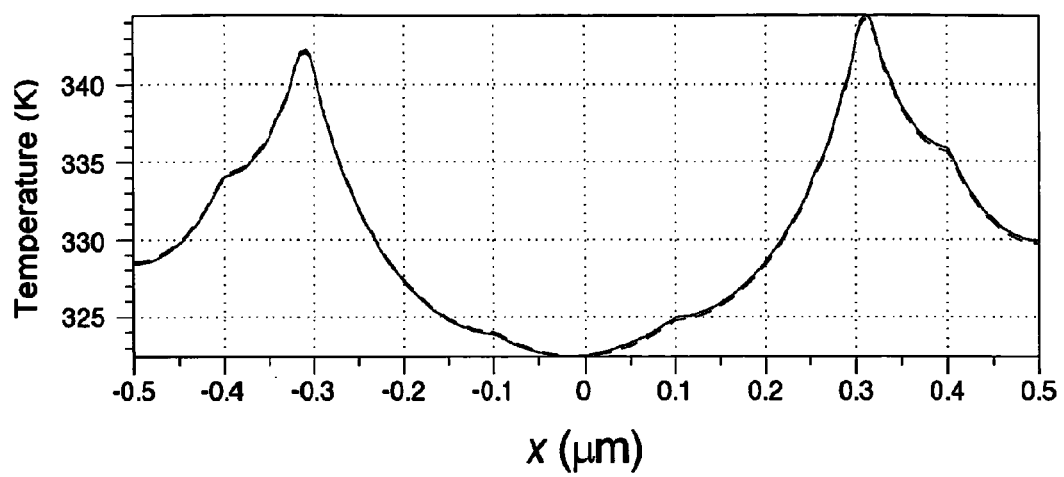
FIG. 13 illustrates the comparison of thermal profiles derived from DNS and the POD thermal model for the two-block structure shown in FIG. 11 along y=−0.01 μm.

To demonstrate the accuracy of the technique, a case with power strengths of 1.6 and 1.8 mW/μm were applied to Devices 1 and 2 of the two-block structure, respectively. This set is not present in any of the DNS cases and in fact outside the range of the data used for generation of POD modes. FIG. 13 shows horizontal profiles taken along y=−0.01 μm (where the hot spots are located). Curves for DNS data from this case are shown with solid lines and curves from the POD model are shown with dashed lines. The POD curves match the solid curves very well. Thus, variations of temperature with power are perfectly captured by this POD model. It should be noted that there were only 3 cases used to generate interior and interface POD modes. The method 300 is however able to accurately represent the temperature profiles on the interface and the volumes of this two-block structure for a power source distribution outside the power range used for generating the POD modes.

As previously mentioned, depending on the design stage larger-size building blocks (e.g., one or more standard cells, one or more functional circuit blocks, or even one or more dies) can be chosen in step 302 (or 402) to generate coarser thermal models for more efficient thermal simulation. To create coarser models of larger building blocks, one can simply repeat the above process using larger partitions. However, to create a function space for a larger partition such as a circuit block or a die, detailed thermal simulations of the circuit block or die are needed which may be too costly to perform. Instead of using the DNS, one can use the reduced-order thermal models of the small blocks to generate the temperature data in step 302 or 402 for the larger partition. Once the data is generated, a thermal model of the larger partition can be obtained with exactly the same procedure in steps 306 and 308 (or 406 and 408) as described above. Similarly, a coarser thermal model of a selected building block with coarser temperature resolution can be generated using temperatures with lower spatial resolution evaluated from the fine-resolution reduced-order thermal models of the block instead of performing the DNS.

Thermal modes for different-size building blocks at different levels of resolution could be stored as libraries for simulations with different levels of granularity. Combination of different-size building blocks with different levels of resolution can be used to capture the steep thermal gradients or hot spots in certain regions of the chip with reasonable computational time. Full chip thermal or electro-thermal simulation therefore becomes possible at a low computational cost.

In addition to generation of the thermal modes described above to account for the variations with power dissipation and boundary conditions, thermal modes can also be obtained to represent a group of blocks that deviates slightly from a standard building block. For example, an interconnect block that is identical to a standard block except for a shift of a via or a metal wire. Such variations can be accommodated by obtaining detailed thermal data on a numerical grid that deforms with the geometric parameter (i.e. the via or wire position). Using this data, the POD modes can then be generated that will be able to represent the temperature profile for any given position of the via or the wire. These modes can then be used for all blocks of a particular type; thus, new building blocks will not be needed for small geometric variations.

With the capabilities and efficiency described above, the methods 300 and 400 can be applied to any stage of semiconductor chip and package design to include thermal awareness in the design process. The methods can also be implemented in other EDA/CAD tools without much difficulty for electronic, photonic, photovoltaic or battery systems, where the thermal information is important, to perform thermal, electrothermal, electromagnetic-thermal, electro-opto-thermal electromechanical-thermal or electrochemical-thermal simulations of the systems. One example of implementing the method of the invention in a circuit simulator for thermal and electro-thermal simulation of the selected system is described below. Similarly, this can also be applied, for example, to the electrochemical circuit models of the battery cells in a circuit simulator for electrochemical-thermal simulation of battery packs.

As presented above, in the methods of the invention the resulting thermal model is described by an ordinary matrix differential equation in function spaces. For a M-mode system given in Eq. (5) representing the thermal model of a single block in the function space, the system can be described by a M-node thermal circuit, together with a reference node, where the vector elements, $a_1$ to $a_M$, denote the temperatures in the function space with respective to the reference temperature in response to the heat sources $P_1$ to $P_M$ generated at Nodes 1 to M. There are totally $M(M+1)/2$ thermal resistances, including $r_{i,j}$ and $r_i$ where the subscripts i,j=1 to M and i≠j. $r_{i,j}$ is the thermal resistance between Nodes i and j, and $r_i$ between Node i and the reference node. In addition, there are M thermal capacitances $c_i$ between Node i and the reference node, where $c_i = c'_{i,j}$ because the capacitance matrix is purely diagonal. In fact, Eq. (5) is equivalent to the matrix form of the node equations for the M-node thermal circuit. Using the node equations together with Eq. (5), $r_{i,j}$ and $r_i$ can therefore be determined in terms of the conductance matrix elements $g'_{i,j}$ in Eq. (5) without much difficulty.

In a multi-block system, the circuit can be constructed in a similar manner. For example, the two-block system given in Eq. (7) representing the twelve-mode thermal model when using the method 300 can be described by a 12-node thermal circuit, together with a reference node. Similarly, thermal resistances of the multi-block thermal circuit in the function spaces can be determined in terms of the elements of the multi-block thermal conductance matrix. When introducing the boundary modes to couple the neighboring blocks in the method 300, the capacitance matrix is not purely diagonal, and some of its matrix elements $c'_{i,j}$ are not zero. However, in a manner similar to solving $r_{i,j}$ and $r_i$ in terms of $g'_{i,j}$, the thermal capacitances in the function spaces, $c_{i,j}$ and $c_i$, can be determined in terms of $c'_{i,j}$, where $c_{i,j}$ is the thermal capacitance between Nodes i and j, and $c_i$ between Node i and the reference node. When using the discontinuous method to construct the coupled thermal model in a multi-block structure in the method 400, the capacitance matrix is purely diagonal and $c_i = c'_{i,j}$. The POD thermal circuit in the function spaces can then be implemented in a circuit simulator to perform thermal simulation of the selected system.

For a nonlinear problem, the resistances, $r_{i,j}$ and $r_i$, and/or capacitances, $c_{i,j}$ and $c_i$, vary with node temperatures $a_i$ that are treated as voltages in a circuit simulator. In many commercial circuit simulators, such as HSpice and SmartSpice, etc., capacitance and resistance values can be given as functions of any node voltages. The nonlinear thermal circuits derived from the reduced-order modeling techniques can therefore be implemented in circuit simulators without much difficulty.

The POD thermal circuit can also be coupled with the electric models of the components in a system to perform electro-thermal simulation of the system. $P_i$ in Eq. (5) for each mode in the POD thermal circuit can be calculated from the given POD modes using power generation IV in devices and joule heat $J^2/\sigma$ in the metal wires, contacts and via, where J is the current density and $\sigma$ the conductivity in the material. $a_i$ can then be evaluated in the circuit simulation, and temperature $T(\vec{x},t)$ in the interconnects and devices can be estimated using Eq. (3). Therefore, thermal influences on material and device properties (such as conductivity in metal and carrier mobility in device channels, etc.) and on electronic characteristics (such as interconnect delays, device currents, and switching speed and power dissipation of logic gates, etc.) can be taken into account self-consistently.

Since the POD thermal circuit only consists of a very small number of nodes for each building block in the function space, it can perform full electro-thermal simulation of a large functional circuit block or a chip and offer detailed temperature distributions at a small cost of computational time.

In a battery system, the POD thermal circuit can be coupled with the electrochemical models of the battery cells for electrochemical-thermal simulation, where the heat sources, including the joule and entropy heats, are provided by the electrochemical models.

Figure 14:
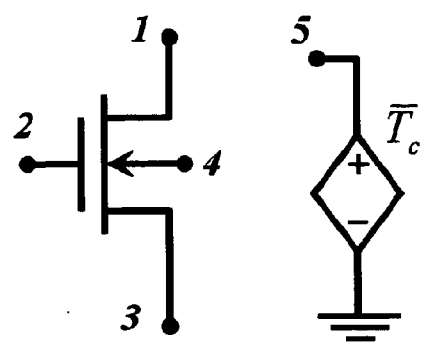
FIG. 14 is a four terminal n-channel SOI MOSFET with Node 5 as the thermal node for the device temperature that is determined by a voltage-controlled-voltage source.

To consider the temperature influence on metal conductivity, one can modify the metal conductivity according to the runtime local temperature without much difficulty. To account for runtime temperature effects on device characteristics, it needs to change the temperature of the device. How to implement temperature variation in devices depends on the device model used in the simulation. For example, when using the BSIMSOI model for SOI MOSFETs in circuit simulation of a semiconductor chip or a functional circuit, device temperature in the device is determined by the thermal node of the BSIMSOI model, as indicated in FIG. 14. A voltage-controlled-voltage source in a circuit simulator can be applied to the thermal node with $T_c$ evaluated as the average channel or device temperature from $T(\vec{x},t)$ in Eq. (3) for the device block. For a different device model, a different approach may be needed to implement the device temperature in the electric device model.

In order to implement the two methods described a computer readable medium containing an executable program for performing steady state and transient thermal simulation of a block-based structure or system is used in conjunction with a computer, The first such program performs (the first method) the acts of: selecting building block; generating interior and boundary thermal modes of a reduced-order model for each block; constructing the reduced-order thermal model of each block using its interior and boundary modes to enforce a coupling of modal solutions between the blocks; storing thermal modes and model parameters in a library for the selected technology; and constructing the reduced-order thermal model for a structure from the generated thermal models for individual blocks in a library. The computer readable medium further performs the act of using the interior and boundary modes to enforce a coupling of modal solutions between the blocks. The computer readable medium also determines whether the simulation requires one or more non-standard building blocks. The medium further performs the acts of generating one or more reduced order thermal, models for the non-standard building blocks; and constructing the reduced-order thermal model for the structure from the generated thermal models for individual blocks in the library.

A second computer readable medium containing an executable program for performing steady state and transient thermal simulation of a block-based structure or system (second method) where the program performs the acts of: selecting building blocks for a technology, performing a detailed numerical simulation of each selected block, generating thermal modes of a reduced-order model for each block, constructing the reduced-order model of each block using a discontinuous method to enforce coupling of modal solutions between the blocks; storing the thermal modes and model parameters in a library for the selected technology; and constructing the reduced-order thermal model for a structure from the generated thermal models for individual blocks in the library. The second computer readable medium determines whether the simulation requires one or more non-standard building blocks. The second method generates one or more reduced order thermal, models for the non-standard building blocks; and constructs the reduced-order thermal model for the structure from the generated thermal models for individual blocks in the library.

Many variations and modifications may be made to the preferred embodiments of the disclosure as describe above. All such modifications and variations are intended to be herein within the scope of the present invention. It is therefore wished to have it understood that the present invention should not be limited in scope, except by the terms of the following claims.

The following references are hereby incorporated herein by reference.

REFERENCES CITED

| U.S. patent applications | | |
|---|---|---|
| 20090104523 | Apr. 23, 2009 | Mullin; Scott; et al. |
| 20090071178 | Mar. 19, 2009 | Major; Gregory A.; et al. |
| 20090044156 | Feb. 12, 2009 | Chandra; Rajit ; et al. |
| 20090023056 | Jan. 22, 2009 | Adams; Daniel T.; et al. |
| 20090004556 | Jan. 1, 2009 | AL-HALLAJ; Said; et al. |
| 20080311468 | Dec. 18, 2008 | Hermann; Weston Arthur; et al. |
| 20080083450 | Apr. 10, 2008 | Benoit; Jeffrey T. ; et al. |

| U.S. Patent Documents | | |
|---|---|---|
| 7,401,304 | July 2008 | Li et al. |
| 7,344,969 | March 2008 | Tan et al. |
| 7,332,820 | February 2008 | Tan et al. |
| 7,335,975 | February 2008 | Cady et al. |
| 7,321,220 | Jan. 22, 2008 | Plett |
| 7,291,036 | Nov. 6, 2007 | Daily, et al. |
| 7,194,711 | March 2007 | Chandra |
| 7,039,888 | May 2006 | Steinmann et al. |
| 6,931,369 | August 2005 | Perry et al. |
| 6,538,191 | Mar. 25, 2003 | MacDonald |
| 6,076,964 | June 2000 | Wu, et al. |

Other Publications

1. M. Pedram, S. Nazarian, "Thermal Modeling, Analysis, and Management in VLSI Circuits: Principles and Methods," Proceedings of the IEEE, Vol. 94, pp. 1487-1501, 2006
2. C. Basaran, Y. Wen, "Analysis of Multilayered Microelectronic Packaging Under Thermal Gradient Loading," IEEE Trans. Comp. Packag. Technol., Vol. 29, p. 850, 2006
3. K. Squadron, M. R. Stan. Huang, S. Velusamy, K. Sankaranarayanan, and D. Tarjan, "Temperature-aware microarchitecture," Proc. ISCA, pp. 2-13, 2003.
4. S. Im and K. Banerjee, "Full chip thermal analysis of planar (2-D) and vertically stacked integrated (3-D) high performance ICs," IEDM Tech. Dig., pp. 727-730, 2000.
5. Akin Akturk, Neil Goldsman, George Metze, "Self-Consistent Modeling of Heating and MOSFET Performance in 3-D Integrated Circuits," IEEE Trans. Electron Dev. Vol. 52, pp. 2395-2403, 2005.
6. J. A. Davis, R. Venkatesan, A. Kaloyeros, M. Beylansky, S. J. Souri, K. Banerjee, K. C. Saraswat, A. Rahman, R. Reif, and J. D. Meindl, "Interconnect limits on gigascale integration (GSI) in the 21st century," Proc. of the IEEE, vol. 89, pp. 305-324, 2001.
7. K. W. Guarini, et al., "Electrical integrity of state-of-the-art 0.13 µm SOI CMOS devices and circuits transferred for three-dimensional (3D) integrated circuit (IC) fabrication," IEDM'02. Dig., pp.943-945, 2002.
8. T. Y. Wang, C. C. P. Chen, "3-D-thermal ADI: A linear-time chip level transient thermal simulator," IEEE Trans. Comput.-Aided Des. Integr. Circuits Syst., vol. 21, pp.1434-1445, 2002.
9. K. Puttaswamy, G. H. Loh, "Thermal Analysis of a 3D DieStacked HighPerformance Microprocessor," Proc. GLSVLSI 2006, pp. 19-24, 2006.
10. G. H. Loh, Y. Xie, B. Black, "Processor Design in 3d Die-Stacking Technologies," IEEE Micro, pp. 31-48, May-June, 2007.
11. A. K. Noor, "Reduced basis technique for nonlinear analysis of structures," AIAA J., vol. 18, pp.455-462, 1980.
12. J. L. Lumley, "Atmospheric turbulence and radio wave propagation," Journal of computational chemistry, Vol. 23, pp. 1236-1243, 1967.
13. N. Aubry, P. Holmes, J. L. Lumley, E. Stone, "The dynamics of coherent structures in the wall region of a turbulent bounday layer," J. Fluid Mech., vol. 192, pp. 115-173, 1988.
14. B. J. O'Donnell and B. T. Helenbrook, "Proper orthogonal decomposition and incompressible flow: An application to particle modeling," Comput. & Fluids, vol. 36, pp. 1174-1186, 2007.
15. D. N. Arnold, F. Brezzi, B. Cockburn, and L. D. Marini, "Unified analysis of discontinuous Galerkin methods for elliptic problems," SIAM J. Numer. Anal., 39(5):1749-1779, 2002.
16. http://www-device.eecs.berkeley.edu/~bsimsoi/
17. M. C. Cheng, K. Zhang, "Non-isothermal Circuit for SOI MOSFETs for Electrothermal Simulation of SOI Integrated Circuits," Int. Semicond. Dev. Res. Symp., College Park, Md., Wp9-06-05, 2007.
18. F. Yu, M. C. Cheng, P. Habitz, G. Ahmadi, "Modeling of Thermal behavior in SOI structures," IEEE Trans. Electron Devices, vol. 51, 83, 2004.
19. F. Yu, M. C. Cheng, "Electrothermal Simulation of SOI CMOS Analog Integrated Circuits," Solid-State Electronics, vol. 51, pp. 691-702, 2007.
20. P. Liu, H. Li, L. Jin, W. Wu, Sheldon X. D. Tan, J. Yang, "Fast Thermal Simulation for Runtime Temperature Tracking and Management," IEEE Trans. Comput.-Aided Des. Integr. Circuits Syst., Vol. 25, pp. 2882-2893, 2006
21. Z. Wangl, B. D. Jensen, L. L. W. Chow, J. L. Volakis, K. Saitou, K. Kurabayashi, "Full-wave electromagnetic and thermal modeling for the prediction of heat-dissipation-induced RF-MEMS switch failure," J. Micromech. Microeng. Vol. 16, pp. 157-164, 2006.
22. D. R. Decker, "MMIC Packaging Design and Research," IEEE Princeton Section Sarnoff Symposium, pp. 0_112-0_117, March 1993
23. J. SM, W. Y. Yin, K. Kang, J. F. Mao, L. W. Li, "Frequency-Thermal Characterization of On-Chip Transformers With Patterned Ground Shields," IEEE Trans. Microwave Theory Techniques, Vol. 55, pp. 1-12, 2007
24. W. Y. Yin, K. Kang, J. F. Mao, "Electromagnetic-Thermal Characterization of on On-Chip Coupled (A)Symmetrical Interconnects," IEEE Trans. Advanced Packaging, Vol. 30, pp. 851-863, 2007

25. J. R. Brauer, P. Wallen, "Coupled 3D electromagnetic, structural, and thermal finite element analysis as integral components of electronic product design," WESCON, pp. 358-364, 1996.
26. M. Loeser, B. Witzigmann, "Multidimensional Electro-Opto-Thermal Modeling of Broad-Band Optical Devices," IEEE J. Quantum Electronics, Vol. 44, pp. 505-514, 2008
27. P. V. Mena, J. J. Morikuni, S. M. Kang, A. V. Harton, K. W. Wyatt, "A Comprehensive Circuit Level Model of Vertical-Cavity Surface-Emitting Lasers, J. Lightwave Technology, Vol. 17, pp. 2612-2632, 1999
28. G. Hatakoshi, M. Ishikawa, "Analysis of thermal response characteristics of semiconductor by self-consistent electro-opto thermal simulation," Proc. IEEE/LEOS 3rd Int. Conf. on Numerical Simulation of Semiconductor Optoelectronic Devices, pp. 27-28, October 2003.
29. M. Thele, E. Karden, E. Surewaard, D. U. Sauer, "Impedance-based overcharging and gassing model for VRLA/AGM batteries," J. of Power Sources, Vol. 158, pp. 953-963 (2006)
30. K. Onda, H. Kameyama, T. Hanamoto, K. Ito, "Experimental Study on Heat Generation Behavior of Small Lithium-Ion Secondary Batteries," J of Electrochemical Soc., Vol. 150. pp. A285-A291 (2003).
31. S. A. Hallaj, H. Maleki, J. S. Hong, J. R. Selman, "Thermal modeling and design considerations of lithium-ion batteries," J. of Power Sources, Vol. 83, pp. 1-8 (1999).
32. M. W. Verbrugge, R. S. Conell, "Electrochemical and Thermal Characterization of Battery Modules Commensurate with Electric Vehicle Integration," J. of The Electrochemical Society, Vol. 149, pp. A45-A53 (2002)
33. M. Ducusin, S. Gargies, C. Mi, "Modeling of a Series Hybrid Electric High-Mobility Multipurpose Wheeled Vehicle," IEEE Trans. Vehicular Tech., Vol. 56, pp. 557-565 (2007)
34. F. V. Gasparyan, "Influence of Thermal Effect on the Efficiency of a Solar Cell," J. of Contemporary Physics Vol. 42, No. 3, pp. 112-115. 2007,
35. M. A. Grepl, Y. Maday, N. C. Nguyen, A. T. Patera, "Efficient reduced-basis treatment of nonaffine and nonlinear partial differential equations," Mathematical Modelling and Numerical Analysis, Vol. 41, No. 3, pp. 575-605, 2007.
36. A. E. Løvgren, Y. Maday, E. M. Rønquist, "A reduced basis element method for the steady stokes problem," Mathematical Modelling and Numerical Analysis, Vol. 40, No. 3, pp. 529-552, 2006.
37. Y. Maday, E. M. Rønquist, "A reduced-basis element method," Journal of Scientific Computing, Vol. 17, No. 1, pp. 447-459, 12 2002.
38. Y. Maday, E. M. Ronquist, "The reduced basis element method: Application to a thermal fin problem," SIAM Journal on Scientific Computing, Vol. 26, No. 1, pp. 240-258, 2004.

We claim:

1. A method for steady state and transient thermal simulation of a block-based structure or system comprising the acts of:
    selecting building blocks for a technology;
    performing a detailed numerical simulation of each selected block;
    constructing a reduced-order thermal model of each block using either one of the following techniques:
        (i) generating interior and boundary thermal modes of said reduced-order model from detailed numerical simulation data for each selected block and using interior and boundary thermal modes to enforce a coupling of modal solutions between said blocks; or
        (ii) generating thermal modes of said reduced-order model from detailed numerical simulation data for said entire domain of each selected block and using a discontinuous method to enforce a coupling of modal solutions between said blocks;
    storing thermal modes and model parameters of said constructed reduced-order thermal models for said selected building blocks in a library for said selected technology;
    constructing said reduced-order thermal model for said block-based structure from said generated thermal models for individual blocks in said library;
    wherein said acts perform a steady state and a transient thermal simulation of said structure;
    further wherein said thermal modes are basis functions of a function space;
    further wherein said thermal simulation is performed in said function space, where a temperature for each thermal mode in said function space is calculated; and
    further wherein said acts are performed using a computer.

2. The method of claim 1 wherein said structure or system can be constructed primarily using a number of standard building blocks wherein said standard building blocks are said selected blocks whose thermal modes and model parameters are stored in said library for a technology;
    further wherein each different technology requires a different set of standard building blocks stored in a library for said technology.

3. The method of claim 2 further comprising the acts of:
    selecting and storing standard building blocks with different sizes, thermal modes and model parameters with different temperature resolutions in said libraries of a technology for simulation of different levels of resolution and efficiency.

4. The method of claim 1 further comprising the act of:
    determining whether said simulation requires one or more non-standard blocks wherein said non-standard building blocks refer to those which are not selected as standard building blocks.

5. The method of claim 1 further comprising the acts of:
    generating one or more reduced-order thermal models for non-standard building blocks; and constructing said reduced-order thermal model for said structure from said generated thermal models for individual blocks in said library with some or no non-standard building blocks wherein said reduced-order model refers to a method that transforms partial differential equations into said function space represented by a finite number of basis functions in order to reduce numerical degrees of freedom (DOF) required to solve said equations;
    further wherein said thermal simulation of said structure based on said reduced-order model involves solving an ordinary matrix differential equation in said function space representing heat flow in said structure and further wherein in steady state, said ordinary matrix differential equation reduces to a matrix equation.

6. The method of claim 5 further comprising the act of generating thermal models for a particular group of non-standard blocks that deviate from a standard one.

7. The method of claim 6 further comprising the acts of generating one or more reduced-order thermal models for said group of non-standard building blocks; and
    constructing said reduced-order thermal model for said structure from said standard building blocks with one or more said generated thermal models for said group of non-standard building blocks.

8. The method of claim 1 wherein said method can be applied to structure materials with nonlinear thermal conductivities and/or specific heats that vary with temperature.

9. The method of claim 8 further comprising the act of applying one or more reduced-order thermal models to perform thermal simulation of said structure in a circuit simulator, accounting for nonlinear thermal resistances and/or capacitances induced by said nonlinear thermal conductivities and/or nonlinear specific heats in said structure materials wherein said thermal simulation of said structure in a circuit simulator based on said reduced-order model involves solving a thermal circuit in said function space representing heat flow in said structure; further wherein nodes or circuit nodes in said circuit represent said thermal modes in said function space and node temperatures are calculated in said thermal circuit simulation.

10. The method of claim 1 wherein said method can be applied to any block-based system or structure
further wherein said block-based system refers to any kind of structures or systems that can be primarily constructed using said standard building blocks, including but not limited to planar semiconductor integrated circuits (IC's) or chips, 3D stacked IC's, 3D stacked dies, 3D packages, optical interconnects, nanowire interconnects, photonic IC's chips, stacked-cell battery packs, LED lighting, MEMS, NEMS, and photovoltaic modules, panels or arrays, including nanotechnology and/or biotechnologies.

11. The method of claim 1 further comprising the act of applying said method to a single-block system or a system with several coupled blocks, wherein a multi-block system comprises standard building blocks with some or no non-standard blocks.

12. The method of claim 1 further comprising the acts of using said technique (i) using said interior and boundary thermal modes of each block to enforce thermal coupling across adjoining blocks in a multi-block system.

13. The method of claim 1 further comprising the acts of using said technique (ii) using said discontinuous method to enforce thermal coupling across adjoining blocks in a multi-block system.

14. The method of claim 1 further comprising the act of applying reduced-order thermal models of several smaller-size blocks to generate a thermal model for a larger-size block wherein said blocks may include standard or non-standard building blocks.

15. The method of claim 1 further comprising the act of using a higher-resolution reduced-order thermal model of a block to generate a lower-resolution thermal model for said block wherein said block may include standard or non-standard building blocks.

16. The method of claim 1 further comprising the acts of applying said reduced-order thermal models to perform electro-thermal simulation of said structure in a circuit simulator, accounting for nonlinear thermal resistances and/or capacitances induced by nonlinear thermal conductivities and/or nonlinear specific heats in said materials for electro-thermal simulation wherein said electro-thermal simulation performs self-consistent calculations accounting for influences of temperature on electric characteristics and of electric power dissipation on the temperature distribution of said structure.

17. The method of claim 1 further comprising the act of coupling said reduced-order thermal models self-consistently with any other models, methods or CAD or EDA tools to perform thermal, electro-thermal, electro-magnetic-thermal, electro-chemical-thermal, electro-opto-thermal, or electro-mechanical-thermal simulations.

18. The method of claim 1 further comprising the act of applying said reduced-order thermal models to a semiconductor structure, including a single- or multiple-device structure, one or more interconnect structures, one or more standard cells, one or more functional circuit blocks, one or more dies, or a mix of any combination of these selected blocks.

19. The method of claim 1 wherein said building blocks can be placed together to construct a thermal model of a larger semiconductor structure, which may include some non-standard blocks.

20. The method of claim 1 further comprising the act of applying said method to conventional planar, 3D stacked IC, 3D packages, photonic, MEMS, microwave, millimeter-wave and other emerging semiconductor technologies, including system in packages (SiPs), through silicon vias (TSVs), stacked multi-chip modules, stacked dies and nanotechnology.

21. The method of claim 1 further comprising the act of applying said method to a stacked-cell battery pack.

22. The method of claim 1 wherein said selected building blocks may include:
one or more battery cells;
part of a case or a whole case that packs said cells;
part of or all spacing material(s) between said case and cells,
one or more built-in protection circuit blocks and/or a mix of any combination of said selected blocks.

23. The method of claim 22 wherein a reduced-order thermal model of a battery pack is generated using said models of said selected blocks with some or no non-standard blocks.

24. The method of claim 23 wherein said battery pack includes any energy storage system using cells or units, such as galvanic cells, voltaic piles, electrolytic cells, fuel cells, biofuel cells, flow cells, and ultracapacitors.

25. The method of claim 1 wherein said method is applied to a photovoltaic module, array or panel.

26. The method of claim 25 wherein said selected building blocks comprise one or more photovoltaic cells; one or more modules; one or more built-in protection circuit blocks; one or more solar panels; or a mix of any combination of said selected blocks.

27. The method of claim 26 further comprising the act of:
generating reduced-order thermal models of a photovoltaic module, panel, or array using the models of said selected blocks with some or no non-standard blocks.

28. The method of claim 27 wherein said photovoltaic cells comprises any type of photovoltaic cells based on crystalline, thin-film, multi-junction, quantum-well, quantum-wire, quantum-dot, and nanoparticle structures.

29. A non-transitory computer readable medium containing an executable program for performing steady state and transient thermal simulation of said block-based structure or system where said program performs the acts of:
selecting building blocks or standard building blocks for a technology;
performing a detailed numerical simulation of each selected block;
generating interior and boundary thermal modes of a reduced-order model from detailed numerical simulation data for each block;
constructing said reduced-order thermal model of each block using its interior and boundary thermal modes to enforce a coupling of modal solutions between said blocks;
storing thermal modes and model parameters of said constructed reduced-order thermal models for said selected blocks in a library for said selected technology;

and constructing said reduced-order thermal model for said block-based structure from said generated thermal models for individual blocks in said library; and wherein said acts perform a steady state and a transient thermal simulation of said structure;

further wherein said thermal modes are basis functions of a function space; and further wherein said thermal simulation is performed in said function space, where a temperature for each thermal mode in said function space is calculated.

30. A non-transitory computer readable medium containing an executable program for performing steady state and transient thermal simulation of a block-based structure or system where the program performs the acts of:

selecting building blocks or standard building blocks for a technology, performing a detailed numerical simulation of each selected block, generating thermal modes of a reduced-order model for each block from detailed numerical simulation data for said entire domain of each selected block, constructing said reduced-order model of each block using a discontinuous method to enforce a coupling of modal solutions between said blocks;

storing said thermal modes and model parameters of said constructed reduced order model for said selected building blocks in a library for said selected technology; and constructing said reduced-order thermal model for said block-based structure from said generated thermal models for individual blocks in said library; and wherein said acts perform a steady state and a transient thermal simulation of said structure;

further wherein said thermal modes are basis functions of a function space; and further wherein said thermal simulation is performed in said function space, where a temperature for each thermal mode in said function space is calculated.

31. A method for steady state and transient thermal simulation of a block based structure or system comprising the acts of:

selecting building blocks or standard building blocks for a technology;

performing a detailed numerical simulation of each selected block;

constructing a reduced-order thermal model of each block using either one of the following techniques:

(i) generating interior and boundary thermal modes of said reduced-order model from detailed numerical simulation data for each selected block and using interior and boundary thermal modes to enforce a coupling of modal solution between said blocks; or (ii) generating thermal modes of said reduced-order model from detailed numerical simulation data for said entire domain of each selected block and using a discontinuous method to enforce said coupling of modal solutions between said blocks;

storing thermal modes and model parameters of said constructed reduced-order thermal models for said selected building blocks in a library for said selected technology;

constructing said reduced-order thermal model for said block-based structure from said generated thermal models for individual blocks in said library; and wherein said acts perform a steady state and a transient thermal simulation of said structure;

further wherein said thermal modes are basis functions of a function space;

further wherein said thermal simulation is performed in said function space, where a temperature for each thermal mode in said function space is calculated further wherein said structure or system can be constructed primarily using a number of standard building blocks wherein said standard building blocks are said selected blocks whose thermal modes and model parameters are stored in said library for a technology;

further wherein each different technology requires a different set of standard building blocks stored in a library for said technology;

further comprising selecting and storing standard building blocks with different sizes, thermal modes and model parameters with different temperature resolutions in said libraries of a technology for simulation of different levels of resolution and efficiency; and further wherein said acts are performed using a computer.

* * * * *